(12) United States Patent
Wood

(10) Patent No.: US 6,915,657 B1
(45) Date of Patent: Jul. 12, 2005

(54) COLD-STORAGE APPLIANCE

(75) Inventor: Ian David Wood, Lowestoft (GB)

(73) Assignee: Applied Design and Engineering Limited, Lowestoft (GB)

( * ) Notice: Subject to any disclaimer, the term of this patent is extended or adjusted under 35 U.S.C. 154(b) by 149 days.

(21) Appl. No.: 10/070,896

(22) PCT Filed: Sep. 13, 2000

(86) PCT No.: PCT/GB00/03521

§ 371 (c)(1),
(2), (4) Date: May 13, 2002

(87) PCT Pub. No.: WO01/20237

PCT Pub. Date: Mar. 22, 2001

(30) Foreign Application Priority Data

Sep. 13, 1999  (GB) .............................................. 9921564

(51) Int. Cl.[7] .................................................. F25D 3/08
(52) U.S. Cl. ........................................ 62/371; 62/457.1
(58) Field of Search .......................... 62/371, 382, 448, 62/457.1

(56) References Cited

U.S. PATENT DOCUMENTS

| | | |
|---|---|---|
| 1,337,696 A | 4/1920 | Ewen |
| 2,077,739 A | 4/1937 | Bryant |
| 2,223,234 A | 11/1940 | Stemme |
| 2,338,889 A | 1/1944 | Yoxsimer |
| 2,360,533 A | 10/1944 | Zeidler |
| 2,386,757 A | 10/1945 | Straubel |
| 2,460,469 A | 2/1949 | Rifkin et al. |
| 2,780,510 A | 2/1957 | Cole, Jr. |
| 2,894,845 A | 7/1959 | Stoddard |
| 2,942,926 A | 6/1960 | Pavelka, Jr. |
| 2,948,498 A | 9/1960 | Johnsen et al. |
| 3,058,320 A | 10/1962 | Foster et al. |
| 3,178,902 A | 4/1965 | Costantini et al. |

(Continued)

FOREIGN PATENT DOCUMENTS

| | | |
|---|---|---|
| CH | 269462 | 7/1950 |
| CH | 663712 A5 | 1/1988 |
| DE | 808 845 C | 7/1951 |
| DE | 1 129 972 B | 5/1962 |
| DE | 1 601 936 | 3/1968 |
| DE | 2017564 | 10/1971 |
| DE | 2 212 857 A | 9/1973 |
| DE | 2262277 | 6/1974 |
| DE | 2823048 | 12/1979 |
| DE | 29 18 222 A | 11/1980 |
| DE | 3015351 | 1/1981 |

(Continued)

OTHER PUBLICATIONS

Patent Abstracts of Japan; Nov. 6, 1989; vol. 013, No. 487 (C–649): abstract for JP 01 191618 A, Matsushita Electric Works Ltd., Aug. 1, 1989.

*Primary Examiner*—Melvin Jones
(74) *Attorney, Agent, or Firm*—Stevens & Showalter LLP

(57) ABSTRACT

A cold-storage appliance comprises an open-topped insulating container defining an external surface, an insulating lid adapted to close the open top of the container, a cooling means adapted to cool the interior but not the exterior of the container, and a structure supporting the container, the lid and the cooling means. In accordance with the invention, the container is mounted to the structure for movement relative to the structure and the lid to open the container and afford access to its interior or to close the container, and at least a majority of the external surface of the container is exposed to ambient air when the container is closed by the lid.

81 Claims, 18 Drawing Sheets

U.S. PATENT DOCUMENTS

| | | | |
|---|---|---|---|
| 3,206,943 A | 9/1965 | Rice et al. | |
| 3,210,957 A | 10/1965 | Rutishauser et al. | |
| 3,230,733 A | 1/1966 | Rutishauser et al. | |
| 3,323,625 A | 6/1967 | Webster | |
| 3,477,243 A | 11/1969 | Schroeder et al. | |
| 3,481,503 A | 12/1969 | Kloess et al. | |
| 3,543,952 A | 12/1970 | Young | |
| 3,545,223 A | * 12/1970 | Elland | 62/237 |
| 3,772,898 A | 11/1973 | Anderson | |
| 3,907,147 A | 9/1975 | Goobeck | |
| 4,019,339 A | 4/1977 | Anderson | |
| 4,085,986 A | 4/1978 | Taub | |
| 4,180,093 A | 12/1979 | Kamezaki | |
| 4,305,625 A | 12/1981 | Gutner et al. | |
| 4,317,607 A | 3/1982 | Gomolka | |
| 4,365,484 A | 12/1982 | Carson et al. | |
| 4,596,427 A | 6/1986 | Pflugfelder | |
| 4,706,466 A | 11/1987 | Yingst et al. | |
| 4,738,117 A | * 4/1988 | Takasugi | 62/200 |
| 4,872,798 A | 10/1989 | Ide | |
| 4,898,294 A | 2/1990 | Jennings | |
| 4,899,554 A | 2/1990 | Kato et al. | |
| 4,926,754 A | 5/1990 | Feuz | |
| 5,029,450 A | 7/1991 | Takano et al. | |
| 5,120,118 A | 6/1992 | Rankin | |
| 5,178,655 A | 1/1993 | Sassier | |
| 5,271,240 A | 12/1993 | Detrick et al. | |
| 5,377,498 A | 1/1995 | Cur et al. | |
| 5,572,984 A | * 11/1996 | Alden et al. | 126/299 R |
| 5,661,978 A | 9/1997 | Holmes et al. | |
| 5,865,037 A | 2/1999 | Bostic | |
| 5,921,095 A | 7/1999 | Lee et al. | |
| 5,927,078 A | * 7/1999 | Watanabe et al. | 62/3.6 |
| 5,927,088 A | 7/1999 | Shaw | |
| 6,176,776 B1 | 1/2001 | Finkelstein et al. | |
| 6,282,914 B1 | 9/2001 | Steinhoff et al. | |

FOREIGN PATENT DOCUMENTS

| | | |
|---|---|---|
| DE | 3126325 A | 1/1983 |
| DE | 3631591 A1 | 7/1987 |
| DE | 4021497 A1 | 1/1992 |
| DE | 42 37 293 A1 | 5/1994 |
| DE | 19546984 A1 | 6/1997 |
| EP | 0023145 A1 | 1/1981 |
| EP | 0036238 A2 | 9/1981 |
| EP | 0 036 238 A2 | 9/1981 |
| EP | 0080916 A1 | 6/1983 |
| EP | 0 405 680 A2 | 1/1991 |
| EP | 0 440 296 A1 | 8/1991 |
| EP | 0 518 183 A1 | 12/1992 |
| EP | 0720824 A2 | 7/1996 |
| EP | 0754636 A1 | 1/1997 |
| EP | 0 819 898 A2 | 1/1998 |
| FR | 933 333 A | 4/1948 |
| FR | 1 377 844 A | 11/1964 |
| FR | 2 777 985 A | 10/1999 |
| GB | 341745 | 1/1931 |
| GB | 418489 | 10/1934 |
| GB | 579071 | 8/1941 |
| GB | 581121 | 8/1941 |
| GB | 602329 | 5/1948 |
| GB | 602590 | 5/1948 |
| GB | 620460 | 3/1949 |
| GB | 628939 | 9/1949 |
| GB | 642475 | 9/1950 |
| GB | 948223 | 1/1964 |
| GB | 1143926 | 2/1969 |
| GB | 1188881 | 4/1970 |
| GB | 1 400 685 | 7/1975 |
| GB | 1430789 | 4/1976 |
| GB | 1484282 | 9/1977 |
| GB | 1551044 | 8/1979 |
| GB | 2154553 A | 9/1985 |
| GB | 2161064 A | 1/1986 |
| GB | 2197639 A | 5/1988 |
| GB | 2317595 A | 4/1998 |
| GB | 2354061 A | 3/2001 |
| JP | 1262387 A | 10/1989 |
| JP | 1262390 A | 10/1989 |
| JP | 2282679 | 11/1990 |
| JP | 10220884 A | 8/1998 |
| JP | 11193966 A | 7/1999 |
| JP | 2002295952 | 10/2002 |
| WO | WO 85/00422 A1 | 1/1985 |
| WO | WO 01/26532 A1 | 4/2001 |
| WO | WO 01/71263 A1 | 9/2001 |

* cited by examiner

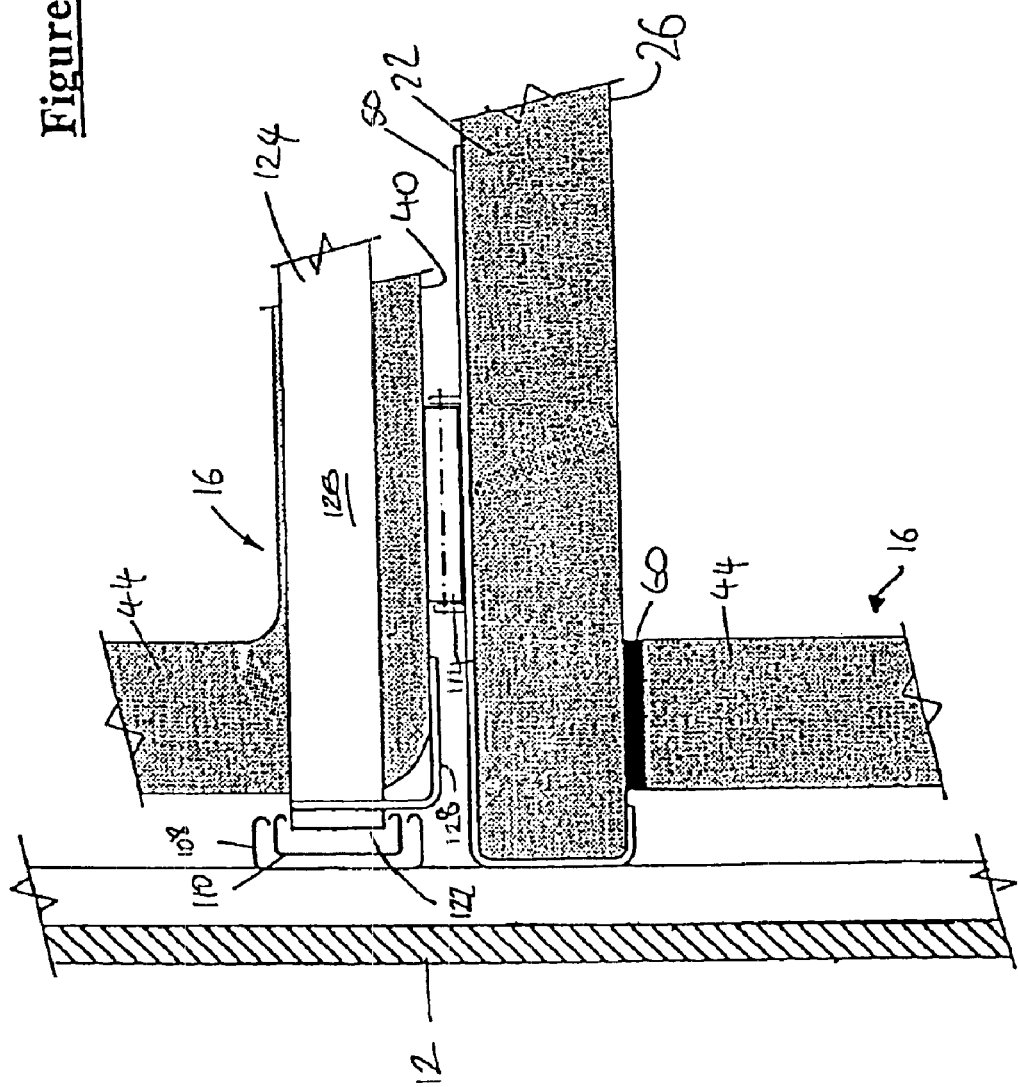

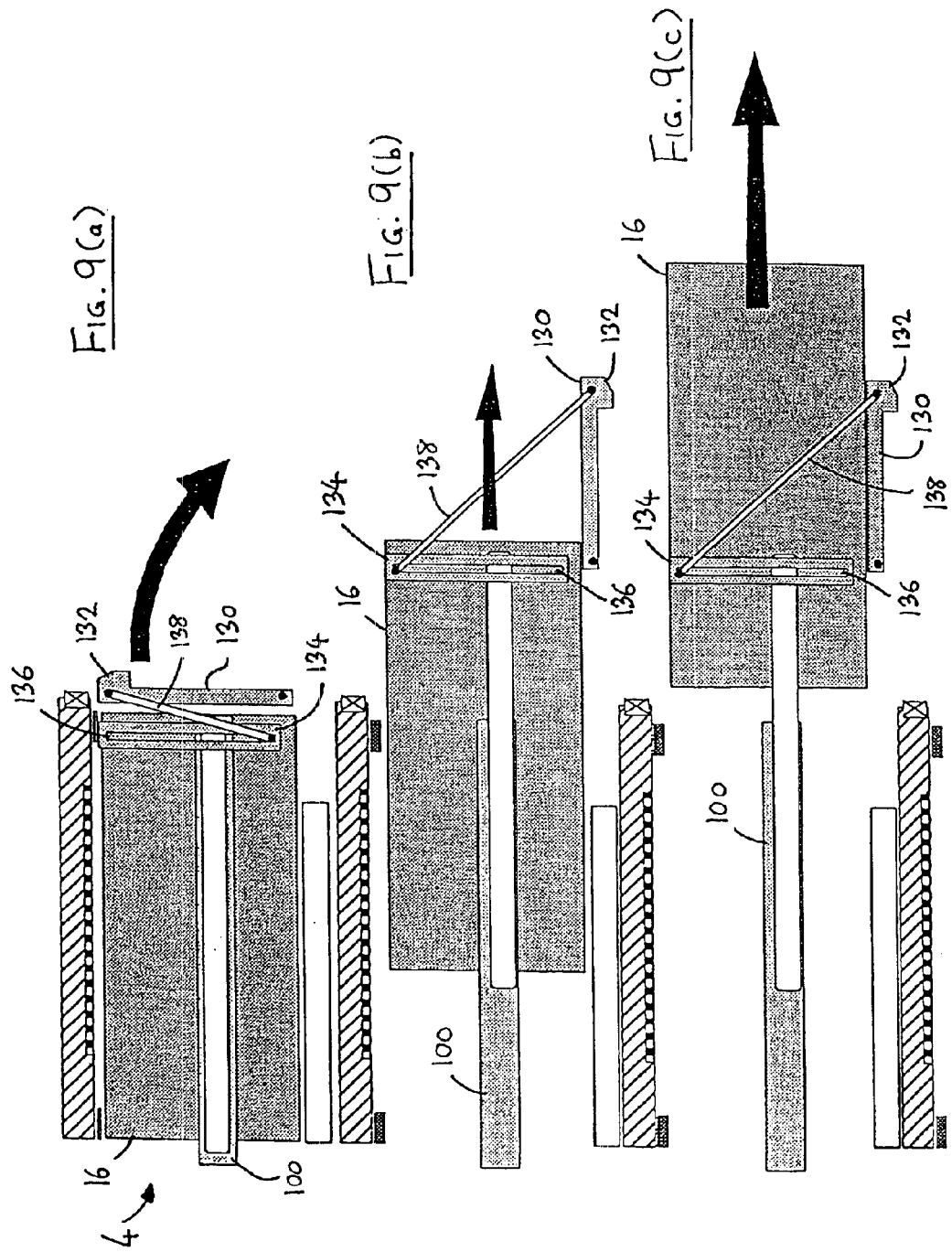

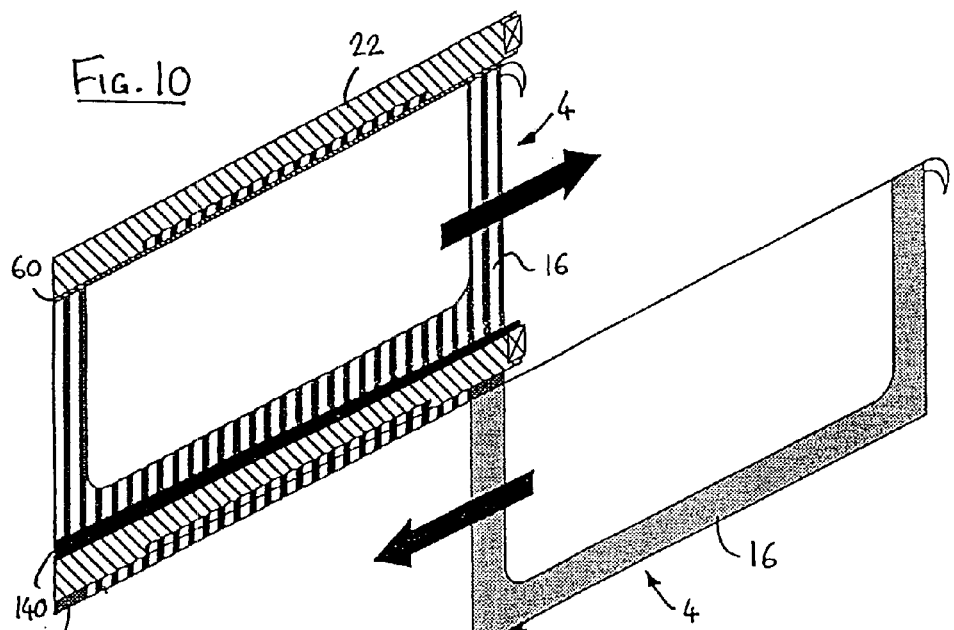

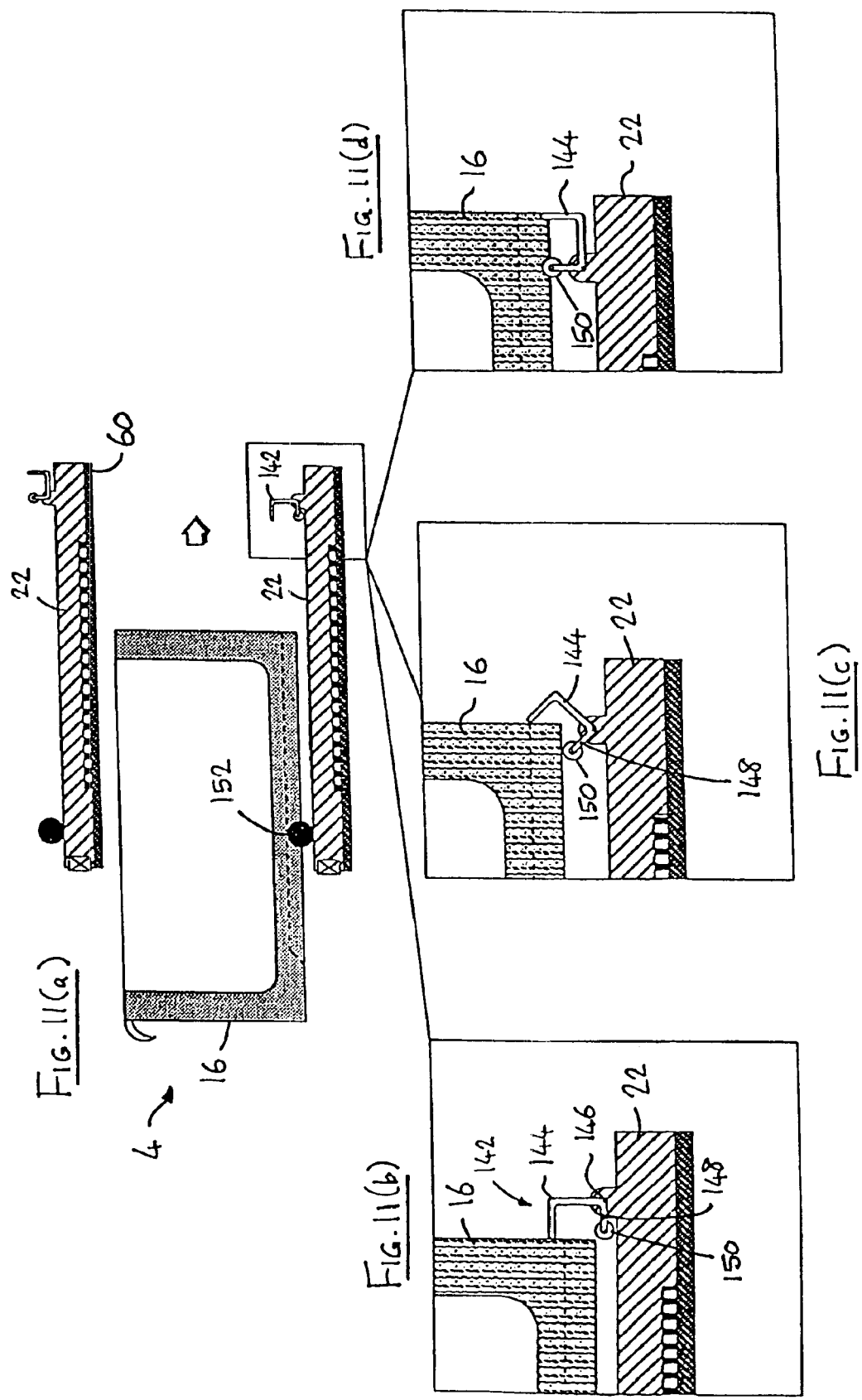

Fig. 13(a)
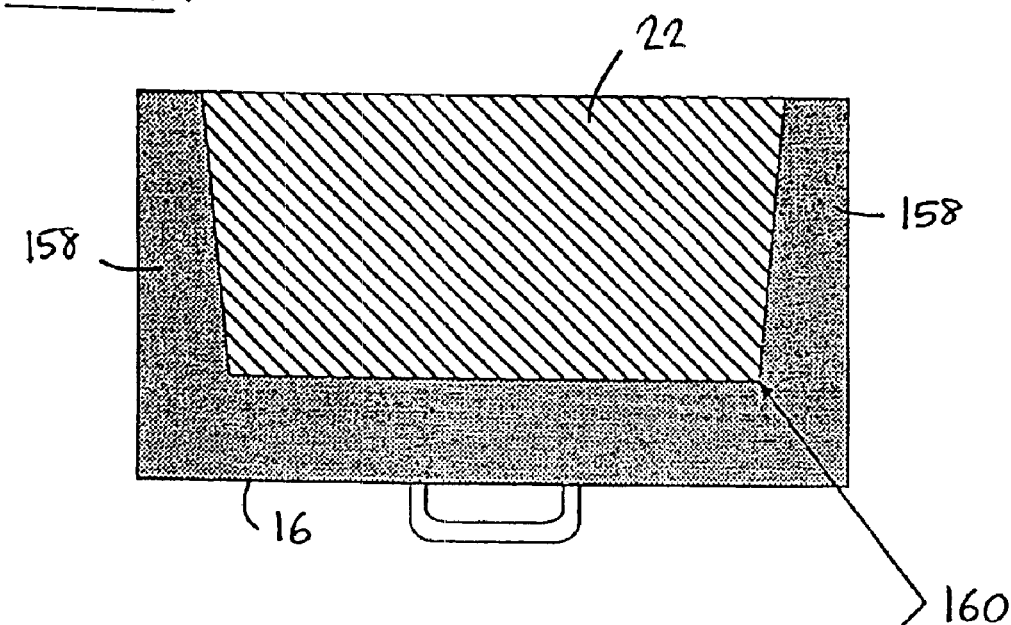
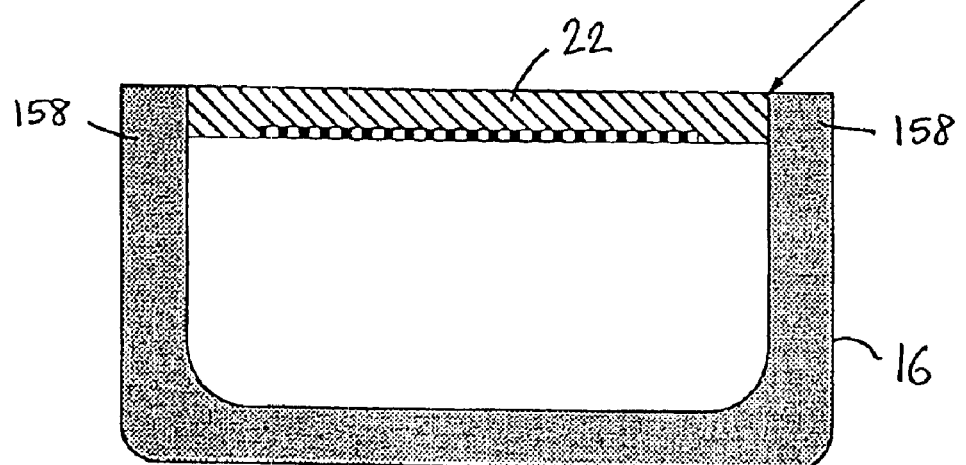
Fig. 13(b)

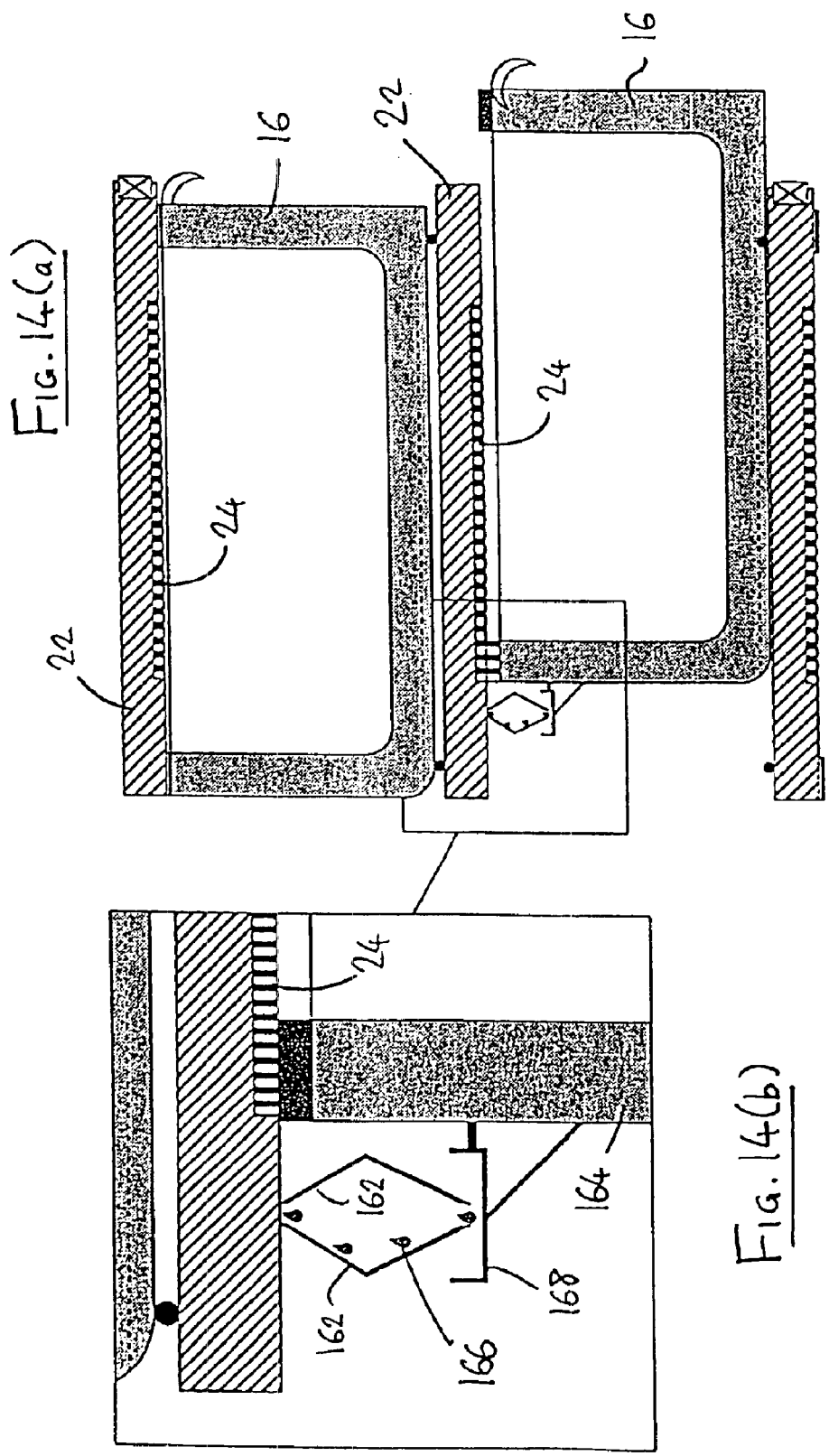

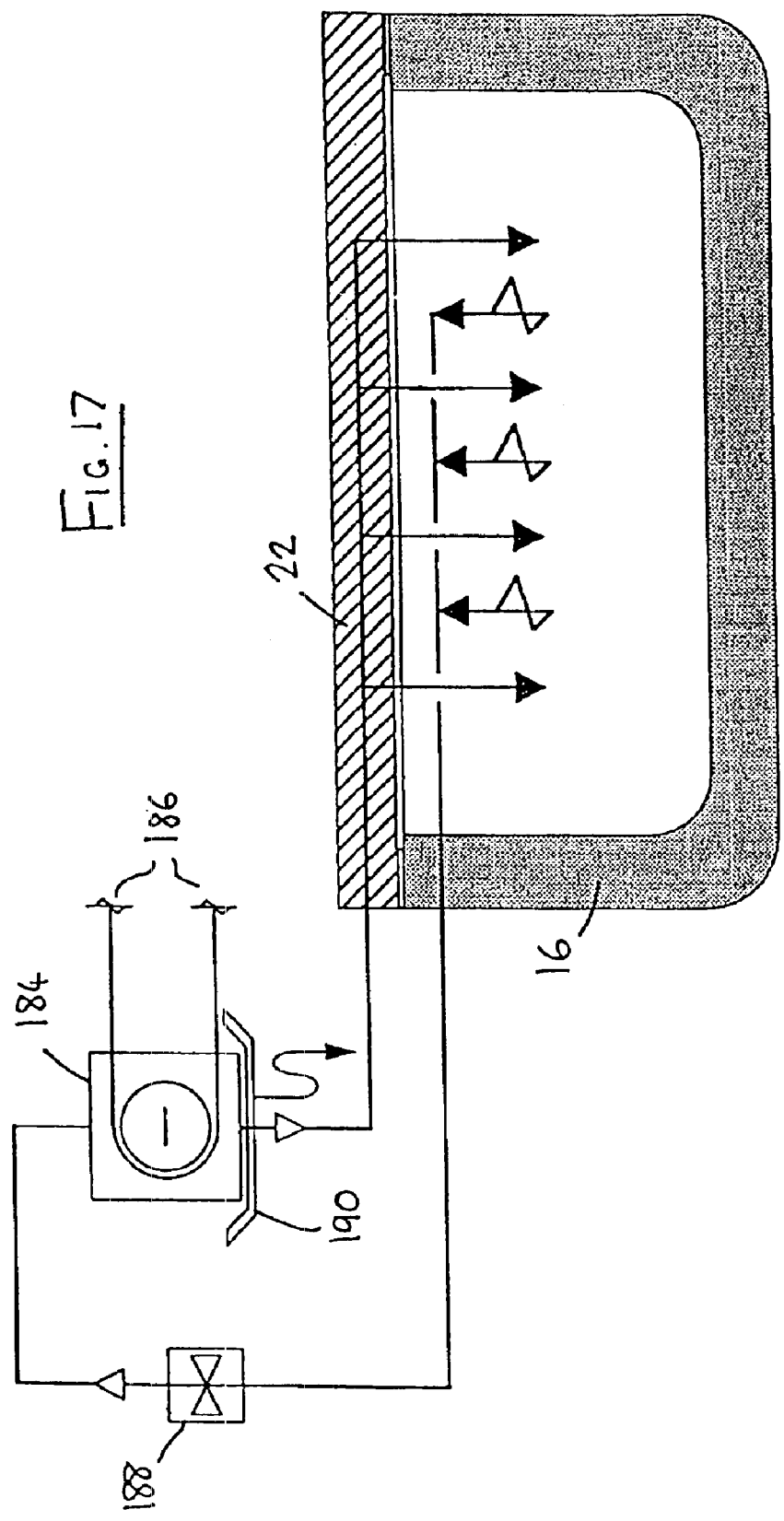

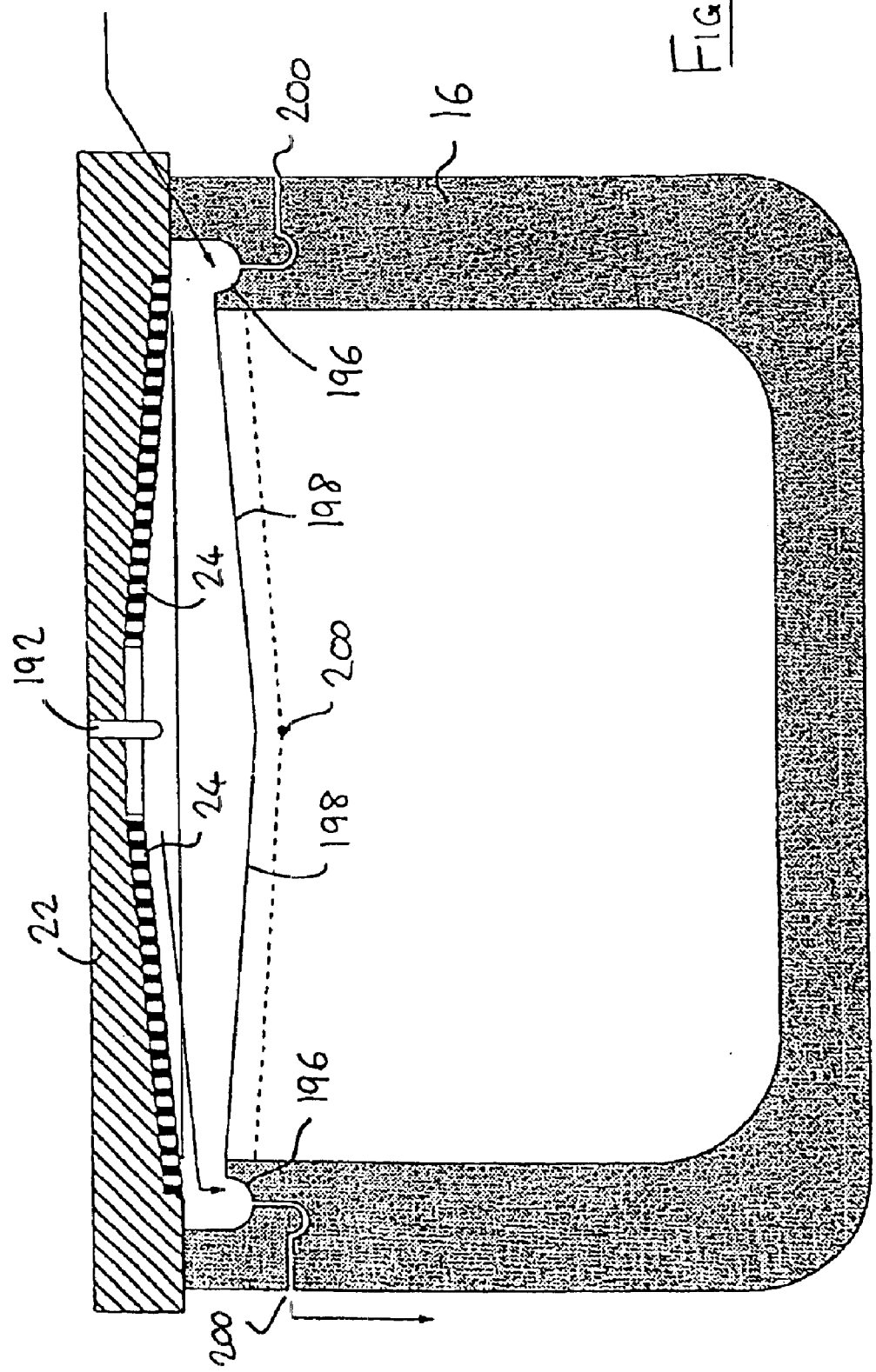

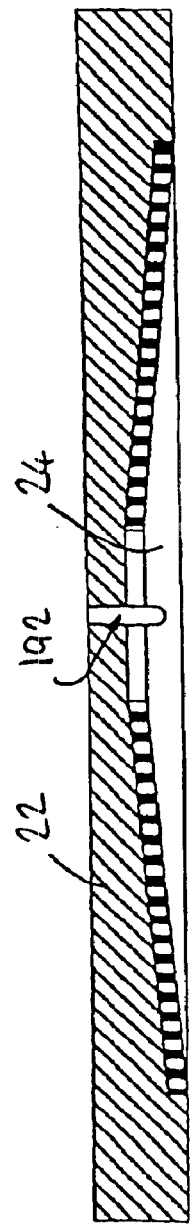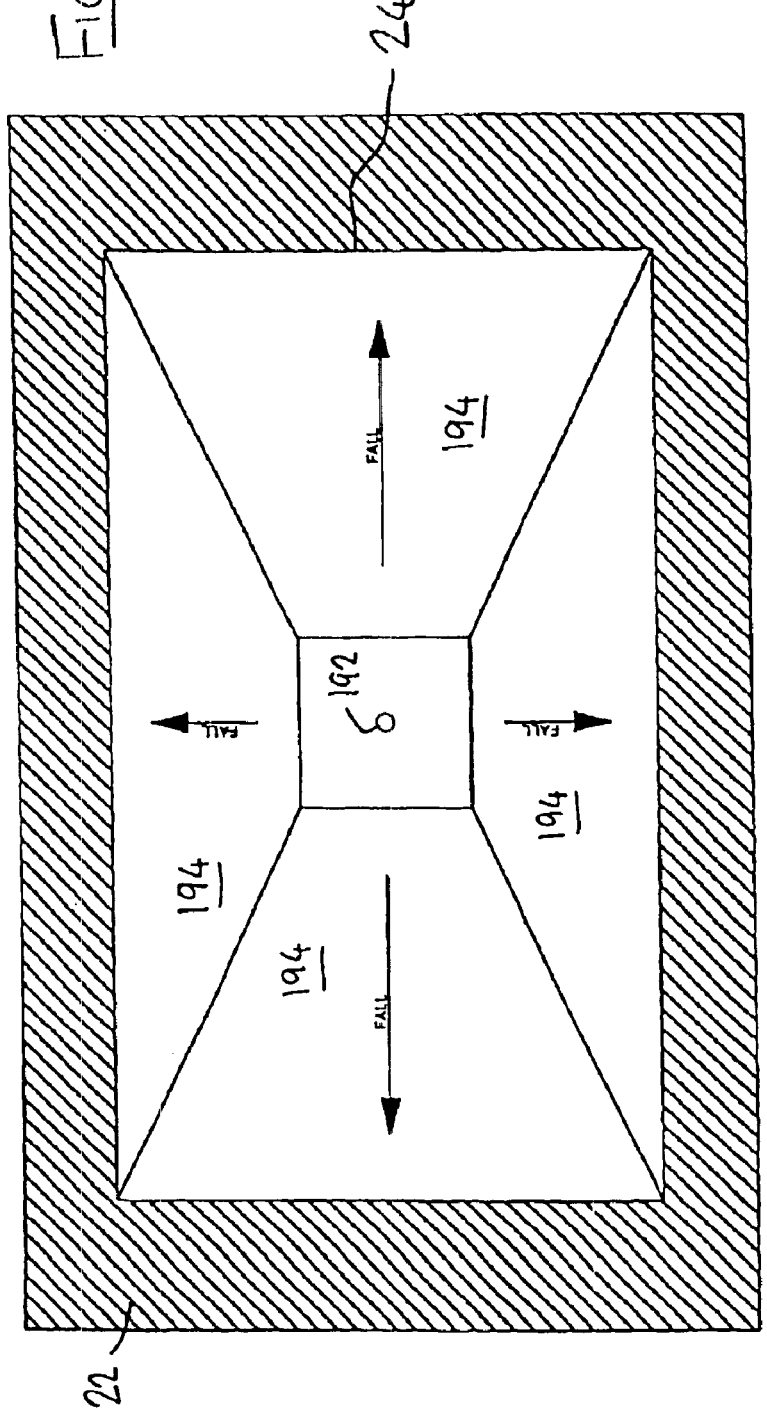
Fig.19(a)
Fig.19(b)

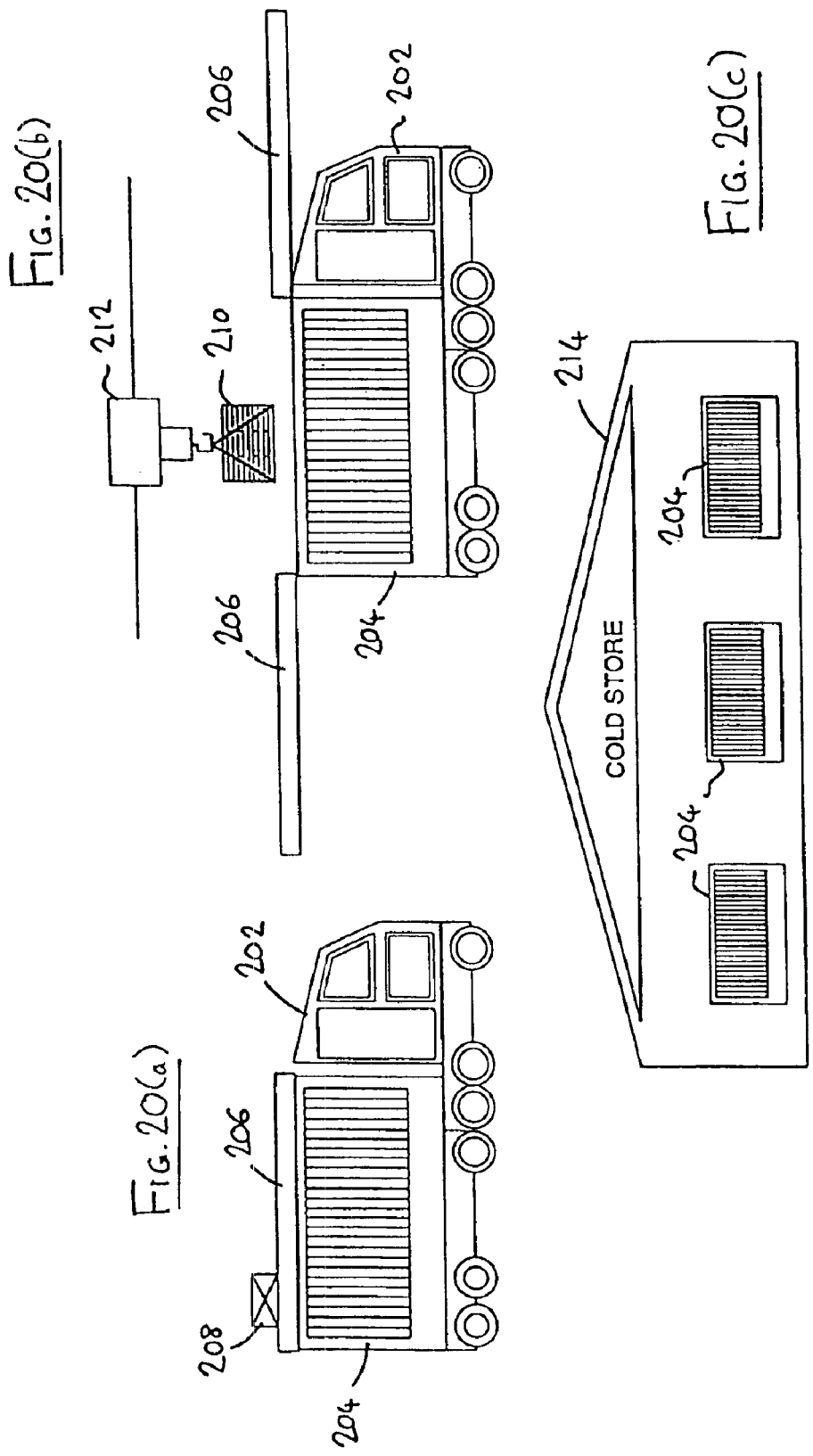

COLD-STORAGE APPLIANCE

BACKGROUND OF THE INVENTION

This invention relates to cold-storage appliances such as refrigerators and freezers for storing foodstuffs and other perishables. Other applications of the invention include storage of chemicals and medical or biological specimens.

The invention can be applied equally well to storing any items within a cooled environment, such as in a refrigerated goods vehicle. The term 'appliance' is therefore to be construed broadly, extending beyond fixed domestic devices into industrial, scientific and mobile applications. Nevertheless, the majority of this specification will describe domestic cold-storage appliances for storing foodstuffs.

The principal reason for storing foodstuffs in refrigerated conditions is to retard their degradation through microbial action or physiological or chemical changes, so that their shelf-life is extended for as long as possible. In order optimally to extend shelf-life through refrigeration, several factors must be considered; for example, the most suitable temperature for storing the foodstuff. In addition, some foodstuffs degrade quickly under the attack of virulent microbes that are readily circulated to other foodstuffs stored nearby, causing cross-contamination. It has long been appreciated that it is desirable to segregate different types of foodstuffs; accordingly, modem refrigerators are usually compartmentalised with the intention that the user will store similar types of food in each compartment.

As cold-storage appliances consume large amounts of power in use, energy efficiency is also an important consideration when designing such appliances. In fact, this is becoming an increasingly important consideration for consumers when they buy electrical appliances such as refrigerators, freezers, washing machines and tumble driers: retailers have responded to this by displaying energy-efficiency ratings on the front of such appliances in their showrooms. Indeed, this an EU requirement.

The typical household refrigerator is an upright cabinet with a hinged door on its front. The door and cabinet form an airtight enclosure via a magnetic compressible seal. Substantially all of the interior of the cabinet defines a storage volume, most commonly partitioned by a number of shelves. Access to all of the shelves is gained by opening the door, which is common to all shelves. The refrigerator also houses a cooler unit situated near to its top which cools the air circulating as a convection current in which the air cooled by the cooler unit sinks to the bottom of the refrigerator around the sides of the interior storage space, and as the air is warmed, it rises up through the centre of the interior back to the cooler unit where it is cooled, and so on ad infinitum.

To allow convection of the cool air around all of the refrigerator to ensure that all stored foodstuffs are chilled, the shelves are typically made of wire so that they offer little resistance to the circulation of air, whilst still being able to support the stored foodstuffs.

Upright freezers often follow this same basic design, although the cooler unit is used to chill the interior of the freezer to below zero Celsius. Upright refrigerators and freezers are often combined and sold as a single unit with a refrigerator occupying the top half of the cabinet and the freezer occupying the bottom half, or vice versa. As different temperatures are required for the two sections, they are partitioned by a solid divide and each section has its own door and cooler unit.

A major problem with upright refrigerators and freezers is the upright door. The coldest air will drop to the bottom of the refrigerator or freezer as it is more dense than warmer air. When the door is opened, this cold air flows freely out of the refrigerator or freezer to be replaced by warm ambient air flowing in at the top. Accordingly, whenever the door is opened, the rush of ambient air into the interior of the refrigerator or freezer causes its temperature to rise: this rise must be redressed by running the cooler unit and hence consuming more energy. Moisture in the incoming ambient air also gives rise to condensation and ice within the cabinet.

A further problem inherent in the upright door is its associated vertical seal. The coldest air that collects at the bottom of the refrigerator or freezer constantly seeks to escape through the sealing interface so that, if the seal forms an imperfect seal between the door and the cabinet, this air will escape.

A common alternative design of freezer is the chest freezer which, as its name implies, is an open-topped chest with a hinged lid closing its top. The interior of a chest freezer is usually partitioned using open wire walls or open wire baskets. As before, the walls or baskets are designed to allow cooled air to circulate freely throughout the freezer by convection.

The chest freezer helps to combat the problems of the upright refrigerator or freezer because its lid seal is not exposed to the coldest and densest air in the same manner. However, the chest configuration is inconvenient and wasteful of space because it precludes use of the space immediately above the freezer, which space must be preserved to allow the lid to be opened. Nor can items be left conveniently on top of the lid. It is also well known that large chest freezers can make access to their contents extremely difficult, it being necessary to stoop down and shift numerous heavy and painfully cold items to get to items at the bottom of the freezer compartment.

Moreover, both upright refrigerators and freezers and chest freezers suffer from a common disadvantage as follows. Generally, users want to access only one part of a refrigerator or freezer at a time. However, as there is generally only a single common door or lid for either a refrigerator or a freezer compartment, each time the door is opened the whole of its interior is exposed to warm ambient air, and so the whole of the interior must be cooled afresh at the expense of further energy consumption.

As mentioned above, segregation of different types of foodstuff is advantageous in avoiding cross-contamination. However, segregation of food is often compromised by the convection principle employed in most refrigerators. As the cooled air must chill the stored foodstuffs, it is circulated throughout the refrigerator. The substantially open baskets or shelves designed to promote circulation of air between the compartments unfortunately also promote the circulation of moisture and harmful bacteria. In addition, any liquid that may spill or leak from a foodstuff container will not be contained by the open partitions: this is particularly a problem for juices running from uncooked meats where the chances of contamination are high and the consequences of cross-contamination can be particularly severe.

As will be appreciated from the foregoing discussion, it is advantageous to divide a refrigerator into compartments, each with its own dedicated door or lid. Embodiments of this idea are disclosed in UK Patent Numbers GB 602,590, GB 581,121 and GB 579,071, all to Earle, that describe cabinet-like refrigerators. The front of the cabinet is provided with a plurality of rectangular openings for receiving drawers. Each drawer has a front panel larger than its respective opening so that a vertical seal is formed around the overlap when the drawer is in a closed position.

The drawers and their contents are cooled by a cooler unit that circulates cooled air by convection within the cabinet, in common with the types of refrigerator already described. To promote circulation of this air amongst all of the drawers, the drawers are open-topped and have apertures in their bottoms. Also, the drawers are disposed in a stepped arrangement, those at the top of the refrigerator extending back less far into the cabinet than the lower drawers so that the rear of each drawer is exposed to the downward flow of cooled air from the cooler unit.

Although only one drawer need be opened at a time, the apertures in the bottom allow cold air to flow freely from the open drawer, which is replaced by warm moist ambient air to the detriment of energy efficiency and with the increased possibility of crosscontamination. Indeed, when a drawer is opened, cold air within the cabinet above the level of that drawer will flood out, drawing ambient air into the cabinet. Furthermore, the drawers encourage ambient air to flow into the interior of the refrigerator because, upon opening, they act as pistons drawing the ambient air into the interior of the refrigerator cabinet. Once in the cabinet, the warm air can circulate as freely as the cold air that is supposed to be there.

Even when closed, the accumulation of cold air towards the bottom of the cabinet will exert increased pressure on the vertical seals of the lowest drawers, increasing the likelihood of leakage if the seal is faulty.

A further example of the above type of refrigerator is disclosed in UK Patent Number GB 602,329, also to Earle. The refrigerator disclosed therein suffers many of the above problems but is of greater interest in that a single drawer consisting of insulated sides and base is provided within the cooled interior of the cabinet. In contrast to the variants outlined above, the sides and base are solid and not perforated so that air cannot flow through them. When the drawer is closed, a horizontal member within the cabinet combines with the drawer to define a compartment, the horizontal member thus being a lid for the drawer. This compartment is provided with its own cooling coils situated just below the horizontal member.

Very little detail is given about the seal that is formed between the drawer and the horizontal member, other than that the horizontal member has a downwardly projecting rear end with a biased edge that makes a close fit with the rear wall of the drawer. Nothing else is said about the junction between the drawer and the horizontal member, apart from the general statement that the drawer is adapted when in its closed position to fit 'fairly snugly' against the horizontal member. It can only be inferred that the drawer and the horizontal member merely abut against each other. Whilst this will impede the passage of air into and out of the drawer, it will not form an impervious seal. As this is not a vapour seal, icing is likely to occur even when the drawer is closed.

The drawer arrangement described creates a compartment in which a different temperature can be set when compared to the essentially common temperature of the rest of the refrigerator. It is particularly envisaged that the drawer can act as a freezer compartment. The Applicant has appreciated a disadvantage in this arrangement, namely that as the freezer drawer resides within the cooled interior when closed, the outer surfaces of the drawer within the cabinet will be cooled to the temperature of the refrigerator. Accordingly, when the drawer is opened, those cooled outer surfaces will be exposed to ambient air containing moisture that will condense on the cooled surfaces leading to an undesirable accumulation of moisture. Condensation involves transfer of latent heat from water vapour to the drawer, thus increasing the burden of cooling the drawer again when the drawer is returned to the closed position within the cabinet.

Additionally, condensed moisture will be transferred to the interior of the refrigerator when the drawer is closed. As discussed above, the presence of water promotes microbial activity. A further disadvantage of introducing water into the interior of the refrigerator is that it may freeze: this can be a particular problem where the drawer of the enclosed compartment meets the insulated top, as any ice formation will form a seal that locks the drawer in a permanently closed position. This disadvantage was appreciated by Earle, as a cam mechanism is included in his proposal to break any ice-formed seals. It is also possible for a build-up of ice to affect the sealing ability of the seal, by preventing mating sealing surfaces from mating correctly.

Of course, the accumulation of ice on moving parts of the drawer mechanism is also undesirable as it will impede movement of the drawer.

SUMMARY OF THE INVENTION

It is against this background that the present invention has been devised. In a broad sense, the invention resides in a cold-storage appliance comprising:

- an open-topped insulating container defining an external surface;
- an insulating lid adapted to close the open top of the container;
- a cooling means adapted to cool the interior but not the exterior of the container; and
- a structure supporting the container, the lid and the cooling means;

wherein the container is mounted to the structure for movement relative to the structure and the lid to open the container and afford access to its interior or to close the container, and wherein at least a majority of the external surface of the container is exposed to ambient air when the container is closed by the lid.

By exposing the external surface of the container to warmer air than it contains, that surface is kept above the temperature at which significant condensation can occur. This is in contrast to the prior art where the external surface of a drawer within a cooled compartment is exposed to ambient air only when the drawer is open, and so is inevitably cold enough to risk condensation when the drawer is opened. In the invention, there is no problem with condensation on the external surface, and hence no problem with latent heat transfer to the container or the icing and cross-contamination difficulties of condensed water within the appliance. Indeed, the external surface of the container does not undergo any significant temperature rise when the container is moved and hence opened.

The invention thus provides a cold-storage appliance having an ambient-exposed surface area enclosing a cooled compartment, in which a majority of that surface area moves upon opening the compartment whereas a minority of that surface area remains stationary. This may be contrasted with the prior art in which a majority of the ambient-exposed surface area remains stationary when the compartment is opened by moving a minority of that surface area. In that sense, the invention goes directly against conventional wisdom.

It is preferred that movement of the container with respect to the structure and the lid includes a major generally horizontal component of movement, to which end the container may be mounted to the structure by means running along at least one generally horizontal track. Such a track suitably includes rails, which rails are advantageously telescopic.

Further or in the alternative, the container can be supported by wheels or rollers running along a generally horizontal support surface.

In any case, to aid seal operation, movement of the container with respect to the structure and the lid preferably includes a minor generally vertical component of movement when the container is near to the lid. More specifically, the container advantageously lifts against the lid upon closing and drops away from the lid upon opening. The track or support surface may, for example, include a ramp effecting this vertical component of movement.

For optimum sealing, the apparatus preferably includes horizontal seal means that seal the container to the lid when the container is closed. The seal is advantageously compressible and may operate magnetically, for example electro-magnetically. The seal could alternatively be of hydraulic or pneumatic type.

To solve the problem of condensation as effectively as possible, it is preferred that substantially all of the external surface of the container is exposed to ambient air when the container is closed. The external surface may comprise a plurality of surface portions, such as are defined by bottom and side walls of the container. For example, the container may be generally cuboidal for best use of space.

In an elegant arrangement, the cooling means is associated with the lid and more preferably is integral with the lid. Cleaning is eased if the cooling means is substantially flush with the underside of the lid.

The appliance preferably further includes shut-down means for shutting down the cooling means when the container is not closed. This saves energy. The shut-down means may, for example, include a switch closed by presence of the container so that the user does not have to remember to operate the shut-down means every time the container is opened or removed from the structure.

Further to improve energy consumption and to minimise cooling of ambient air within the appliance, a retractable screen is preferably provided being extensible across and suitably beneath the cooling means when the container is open. For example, the screen may be furled on a roller when retracted, and is preferably heat-reflective.

For automatic extension and retraction, the screen may be attached at one end to the structure and at an opposed end to the container or to means such as a cradle associated with the container, and is advantageously biased into a retracted configuration. If attached to the container, the screen should preferably be attached to the container in a removable manner so that the container can be removed from the appliance. In that event, the appliance suitably includes a retaining means for retaining the screen in a wholly or partially extended configuration when the screen is detached from the container. However, where means such as a cradle is employed, the screen can remain attached to the cradle even when the container is removed from the appliance.

To remove water or ice from the screen, a wiper or scraper may be provided. The wiper or scraper is suitably operable during retraction of the screen.

For optimum flexibility of storage use, it is much preferred that the cooling means is adjustable so that the same container can be used to chill or to freeze.

The structure of the appliance may be a cabinet and/or may include a frame. The appliance can be adapted to be built-in between cupboards or other structures, for example by the removal of decorative side panels. In any event, it is preferred that the structure and/or any surrounding structure defines at least one ambient air circulation channel around the external surface of the closed container.

Means may conveniently be provided to draw in ambient air from the front of the appliance, and/or to exhaust ambient air to the front of the appliance. To this end, the structure can define a front panel including at least one opening for admission or expulsion of air. This front panel preferably further comprises control and/or display means.

For optimum circulation, the appliance preferably further comprises an impeller for promoting admission and exhaustion of ambient air.

It is preferred that the container is removable from the structure, so that the container can be removed for cleaning or so that it can be taken away from the appliance with its chilled or frozen contents still inside. In that latter event, an auxiliary insulated lid or cover is preferably attachable to the container upon its removal from the structure. The removed container can be used on a picnic, for example, or may be used in conjunction with a replacement container when there is a need for temporary additional cooled storage.

To afford access to a container from different sides of the appliance, the container can advantageously be moved with respect to the structure in a plurality of different directions to open the container.

To segregate and organise the interior of a container for storage of different items, means such as partitions, boxes and shelves can be provided to divide the interior of the container.

In preferred embodiments, the appliance of the invention has a plurality of containers, each having an associated lid and cooling means. In that case, it is much preferred that the cooling means are independently controllable so that each compartment can be set to a temperature appropriate to its contents, and preferably so that the ratio of chilled to frozen storage space can be varied at will simply by adjusting the temperature of a compartment above or below a threshold of, say, zero Celsius. Whilst it is simplest if the respective cooling means are connected to a common refrigerator engine, it is possible to have a plurality of refrigerator engines. For example, it would be possible to have an individual refrigerator engine for each compartment.

To emulate the space efficiency, familiarity and convenience of upright refrigerators and freezers but without suffering their numerous disadvantages as discussed above, the containers are preferably stacked one above another. The containers are suitably of different interior sizes, shapes or volumes.

Viewing means may be provided to assist a user in viewing the contents of a container. For example, a window may be provided in the front and/or bottom of a container, or a suitably-angled mirror can be placed above the container when open.

The already minimal risk of cross-contamination between compartments can be reduced almost to zero by including means for preventing opening of a container when another container is open.

Where the appliance includes structures such as a track, a support surface or a retracted screen, it is preferred that these structures are exposed to ambient air so that there are no problems with icing.

BRIEF DESCRIPTION OF THE DRAWINGS

In order that the invention can be more readily understood, reference will now be made, by way of example only, to the accompanying drawings in which:

FIG. 8 is an enlarged schematic detail view of portions of two drawers of an appliance in accordance with the invention, showing yet another way of mounting the drawers to the appliance and of mounting bins removably to the drawers;

FIGS. 9(a), 9(b) and 9(c) are a sequence of sectional schematic side views showing a variant in which a drawer is opened by opening a hinged door on the front of the appliance, the door being linked to the drawer to pull the bin forward as the door opens;

FIG 10 is a sectional schematic side view showing another variant in which drawers are mounted on inclined supports so that gravity assists closing and sealing;

FIGS. 11(a), 11(b), 11(c) and 11(d) are sectional schematic side views of a variant in which a crank assists lifting a bin into sealing engagement with a top seal as the drawer is closed, FIG 11(a) being a general overview and FIGS. 11(b) to 11(d) being a sequence of enlarged detail views showing the interaction of the crank and the bin as the drawer moves rearwardly;

FIGS. 13(a) and 13(b) are sectional schematic plan and front views respectively showing a variant employing side seals between a bin and a lid;

FIGS. 14(a) and 14(b) are sectional schematic side views, FIG. 14(a) being a general overview and FIG. 14(b) being an enlarged detail view, showing a dualaction scraper to remove ice or moisture from an evaporator during both opening and closing of a drawer;

FIG. 16 is a sectional schematic side view showing a defrost tray that sits in a bin when a drawer is left partially closed to defrost the evaporator, the tray thereby catching moisture dripping from the evaporator;

FIG. 17 is a sectional schematic side view showing a fan coil cooling arrangement applied to a bin, which may similarly be applied to a plurality of bins;

FIG. 18 is a sectional schematic front view through a bin of another variant and its lid, showing how the lid includes a dished evaporator promoting drainage of moisture into drainage gutters around the upper peripheral wall of the bin;

FIGS. 19(a) and 19(b) are schematic sectional and plan views respectively of the lid of the variant shown in FIG. 18; and FIGS. 20(a), 20(b) and 20(c) are schematic views of a scaled-up extension of the inventive concept, being applied to bulk storage in a cold store and commercial transportation in a refrigerated vehicle.

DETAILED DESCRIPTION OF THE INVENTION

Figure 1:
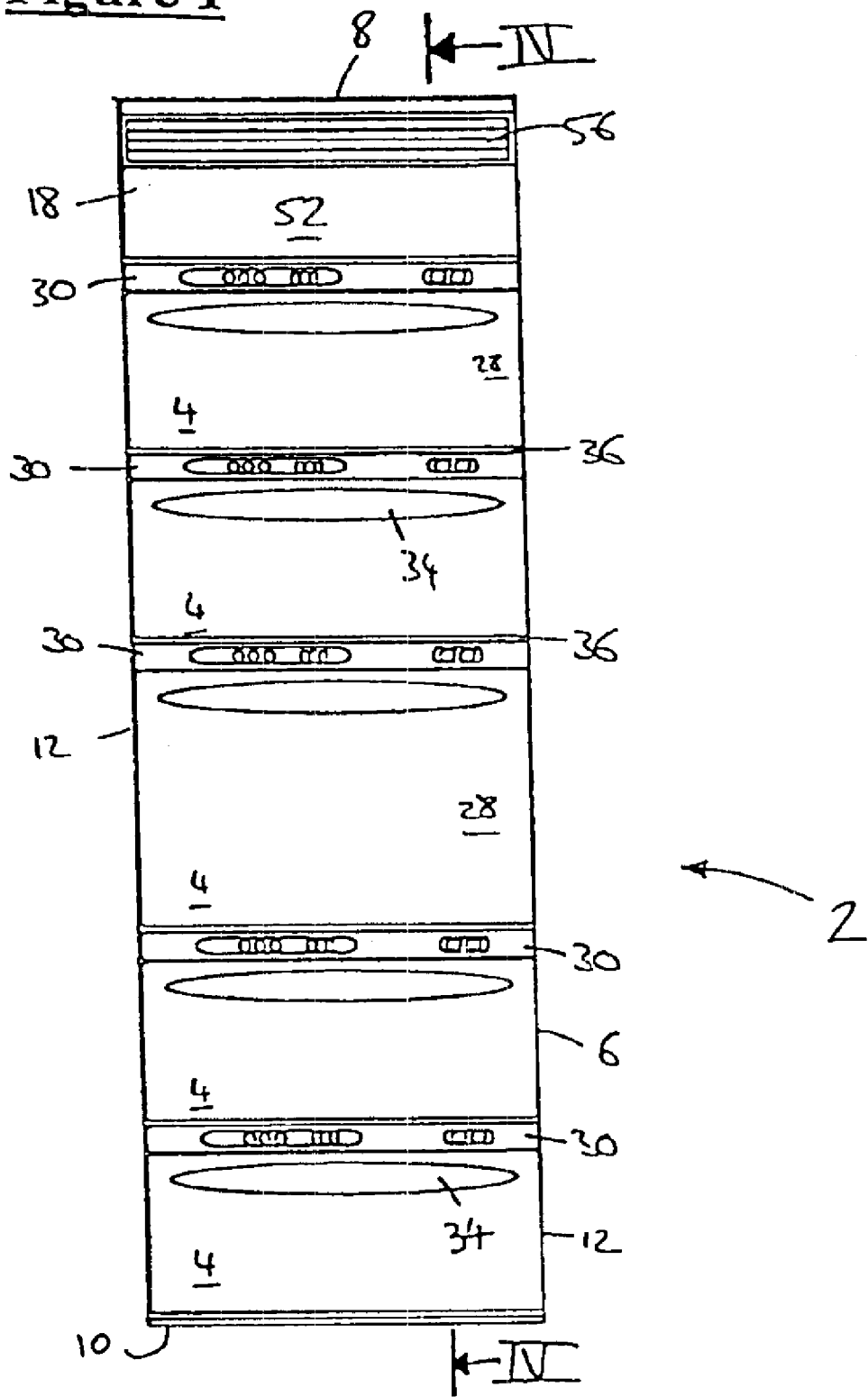
FIG. 1 is a front view of a refrigerator/freezer appliance according to an embodiment of the invention, showing a vertical array of drawers each including a bin.

FIGS. 1 to 4 show a refrigerator/freezer appliance 2 according to an embodiment of this invention. The appliance 2 is of upright cuboidal configuration, and comprises five rectangular-fronted drawers 4 arranged one above another and housed in a cabinet 6 comprising top 8, bottom 10, side 12 and rear 14 panels. Any of these panels can be omitted if it is desired to build the appliance 2 into a gap between other supporting structures; in particular, the side panels 12 can be omitted if neighbouring cupboards can be relied upon for support or otherwise to perform the function of the side panels 12. The panels 8, 10, 12, 14 may or may not be structural but if they are not, a frame (not shown) provides support for the various parts of the appliance. If a frame is provided, it is structurally unnecessary to have panels.

Figure 2:
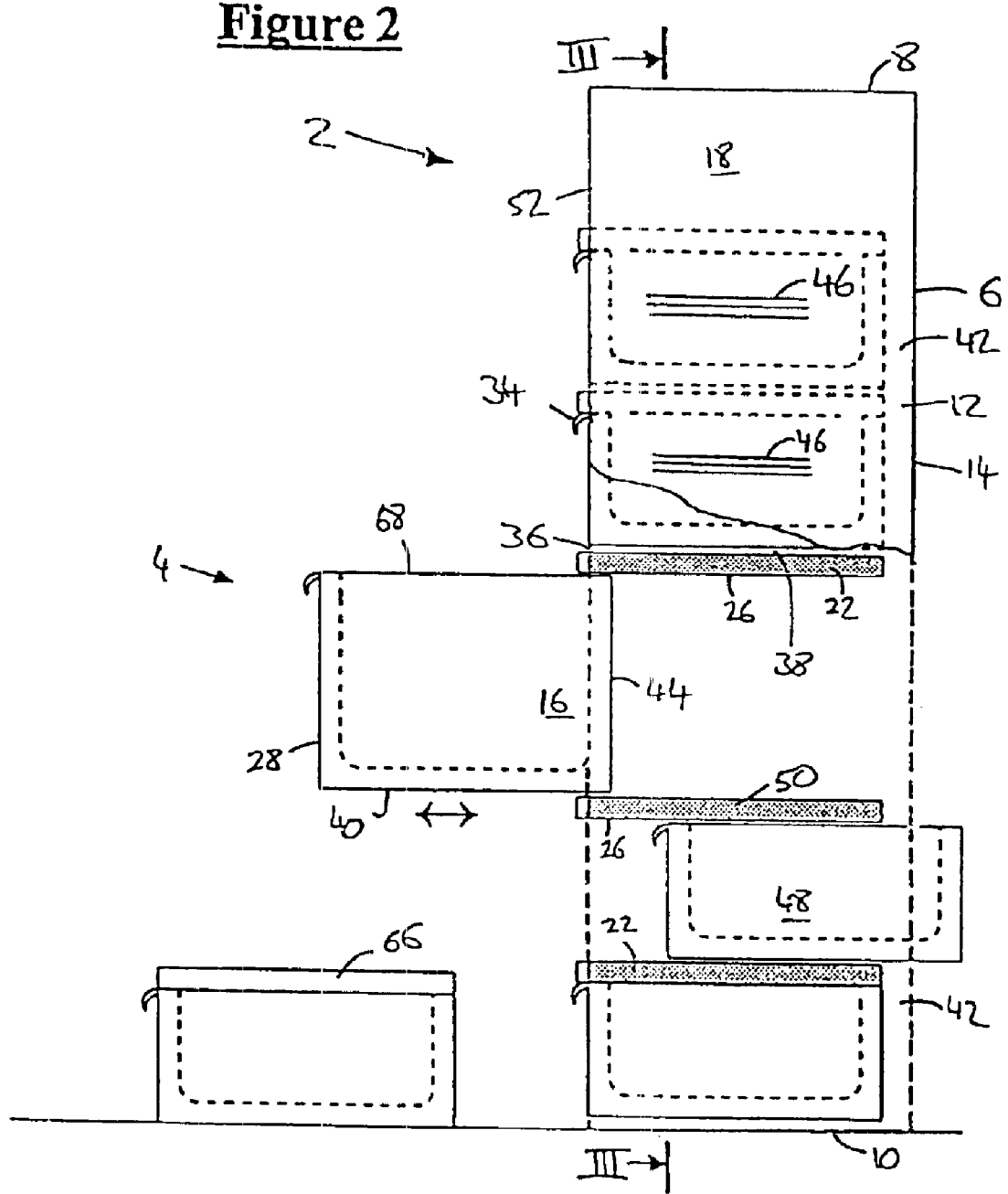
FIG. 2 is a side view of the appliance of FIG. 1, with a lower portion of a side panel removed so that the sides of the drawers can be seen.

The drawers 4 can be slid horizontally into and out of the cabinet 6 by means of tracks on the sides of the drawers 4 that will be described in more detail below. If there is no back panel 14, it is possible for a drawer 4 to be removed from the cabinet 6 in more than one direction, as shown in FIG. 2.

Each drawer 4 comprises an insulated open-topped bucket-like container 16, at least one container 16 (in this case, that of the central drawer 4) being of a different depth to the other containers 16 to define a different internal volume. These containers 16 will be referred to in this specific description as bins 16. The bottom bin 16 leaves only a narrow gap to the bottom panel 10 of the cabinet 6, whereas the top bin 16 leaves a substantial space at the top of the appliance 2 under the top panel 8, allowing room for a compartment 18 that accommodates a refrigerator engine 20, for example including condenser and compressor means as is well known.

The relatively deep bin 16 of central drawer 4 is intended to hold bottles and other relatively tall items stored upright, whereas the other, relatively shallow bins 16 are for correspondingly shallower items. Compared to the shelves and other compartments defining the main storage volume of a conventional upright cold-storage appliance, all of the bins 16 have a favourable aspect ratio in terms of the substantial width of the access opening compared to the depth of the compartment thereby accessed. It is therefore very easy to reach every part of the interior of a bin 16 when a drawer 4 is opened.

The interior of the cabinet 6 is divided by five insulated lids 22, one for each drawer 4, that are generally planar and horizontally disposed. When a drawer 4 is closed, the open top of its associated bin 16 is closed by an appropriate one of the lids 22 in a manner to be described. The lids 22 include cooling means 24 being evaporator elements of known type disposed in the lower face 26 of each lid 22 to cool the contents of a bin 16 closed by that lid 22.

Each bin 16 has a generally flat front face 28 that is exposed when the drawer 4 is closed. The front face 28 could be provided with a decorative panel as is well known. When the drawer 4 is closed, the front face 28 of the bin 16 is bordered at the top by a control and display panel 30 dedicated to that bin 16, the panel 30 being co-planar with the front face 28. The panel 30 is supported by the front edge 32 of the appropriate lid 22, the panel 30 being recessed into the front edge 32 of the lid 22.

The control and display panel 30 contains a number of displays, switches and audible alarms, thus providing a user interface for each bin 16. For example, the interface will most commonly be used for selecting the temperature to which the bin 16 is to be cooled, but also contains temperature displays, on/off and fast-freeze switches, a light indicating when the drawer 4 is open and an audible alarm to indicate when the drawer 4 has been open longer than a predetermined time or when the temperature inside the bin 16 has reached an upper or lower threshold.

A rounded handle 34 extends across substantially the entire width of the top portion of the front face 28 to enable the drawer 4 to be pulled out when access to the interior of the bin 16 is required.

The bottom of the front face 28 of each bin 16 is bordered by a slot 36 that, as will be described, admits ambient air into the cabinet 6. To do so, each slot 36 communicates with an air gap 38 extending beneath the entire bottom face 40 of the associated bin 16 to meet a void 42 maintained behind each bin 16, the void 42 being defined by the inner surfaces of the back 14 and side 12 panels of the cabinet 6 and the backs 44 of the bins 16. As can be seen particularly from FIG. 4, the void 42 extends behind each bin 16 from the base panel 10 of the cabinet 6 to communicate with the refrigerator engine compartment 18 at the top of the cabinet 6.

Figure 3:
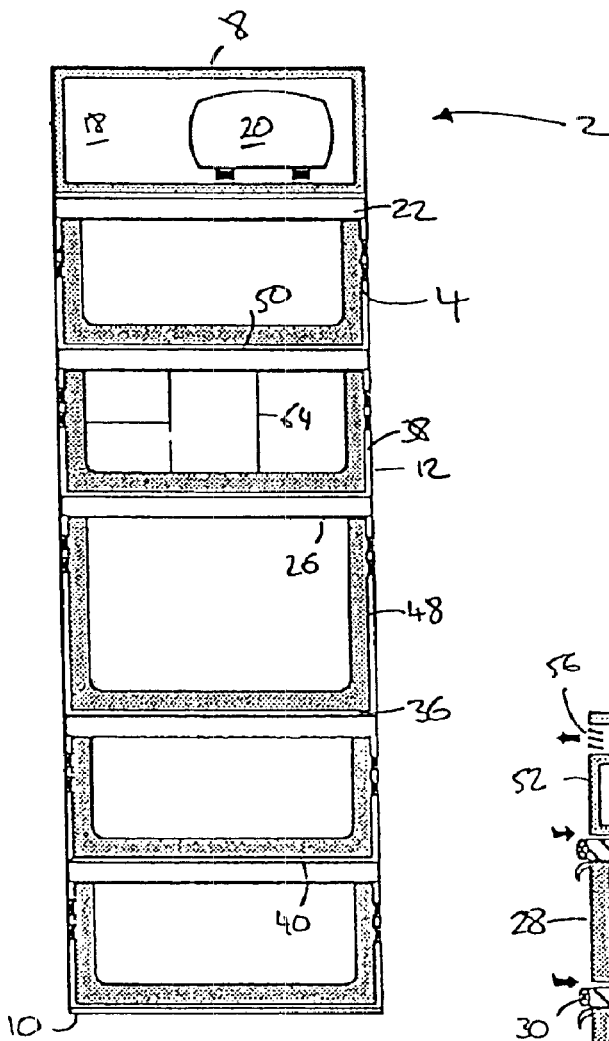
FIG. 3 is a section along line III—III of FIG. 2 but with the drawers closed.
Figure 4:
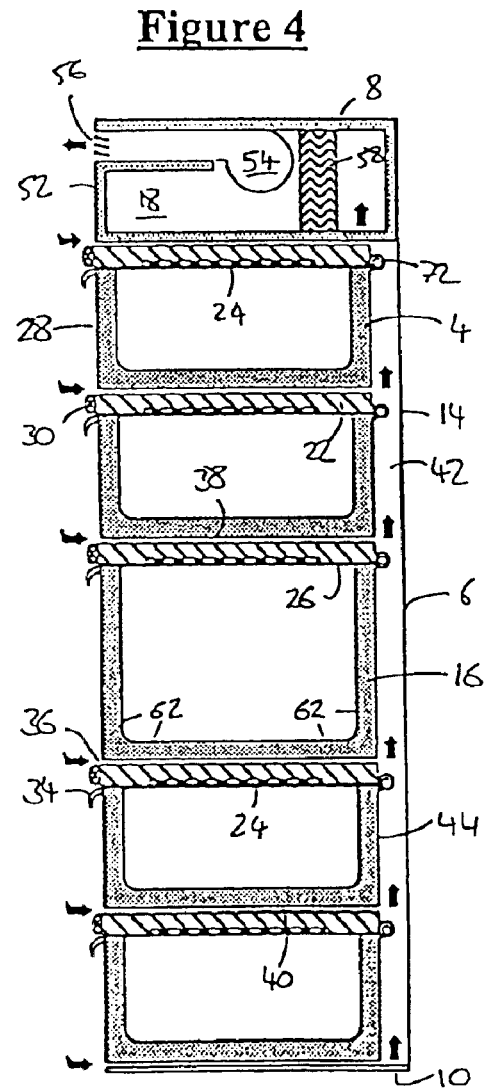
FIG. 4 is a section along line IV—IV of FIG. 1.

The air gaps 38 beneath the bins 16 and the void 42 behind the bins 16 also communicate with air gaps 38 to the sides 48 of the bins 16. Optionally, vents 46 are provided in the side panels 12 of the cabinet 6 adjacent to the bins 16 through which ambient air can also be admitted. As best illustrated in FIGS. 3 and 4, air gaps 38 extend around all bar the top side of each bin 16, so that ambient air entering the cabinet 6 through the slots 36 can circulate freely around the sides 48, bottom 40 and rear 44 of each bin 16. It will also be noted that ambient air can circulate freely over the top surface 50 of each lid 22. To allow this airflow over the uppermost lid 22, which does not have a bin 16 above, a slot 36 is provided under the front face 52 of the refrigerator engine compartment 18.

It will be noted that the piston action created by opening a drawer 4 that sucks ambient air into the interior of the appliance 2 does not pose a problem in this invention. In fact, this action is advantageous as it promotes circulation of ambient air within the cabinet 6.

FIG. 4 shows that the refrigerator engine compartment 18 includes an impeller 54 exhausting through apertures 56 provided in the front face 52 of the refrigerator engine compartment 18. As best seen in FIG. 1, these apertures 56 extend horizontally across the width of the front face 52. The impeller 54 communicates with the void 42 behind the bins 16 to draw air from the void 42, thus continuously promoting the induction of ambient air through the slots 36 and the optional side vents 46. Upon entering the refrigerator engine compartment 18, this air is drawn through the heat-exchange matrix 58 of the condenser.

Accordingly, ambient air entering the cabinet 6 through the front slots 36 and, if provided, the side vents 46, leaves the cabinet 6 through the apertures 56 provided in the front face 52 of the refrigerator engine compartment 18, and so ambient air is circulated through the cabinet 6. More specifically, ambient air enters the appliance 2 where it immediately comes into contact with the outer surfaces 40, 44, 48 of the bins 16 and warms them to ambient temperature (or substantially so) before being drawn towards the void 42 and then upwards through the void 42 by the circulation of the air. The arrows of FIG. 4 demonstrate this circulation of air through the appliance 2. Accordingly, the interior of the cabinet 6 is kept close to ambient temperature, and only the interior of each bin 16 is cooled.

By exposing the external surfaces 28, 40, 44, 48 of the bin 16 to warmer air than it contains, there is no problem with condensation on the external surfaces 28, 40, 44, 48, and hence no problem with latent heat transfer to the bin 16 or the icing and cross-contamination difficulties of condensed water entering the cabinet 6.

In any event, cross-contamination would be unlikely to occur because each bin 16 is tightly sealed when its drawer 4 is closed. So, even if microbes enter the cabinet 6, they cannot readily gain access to other bins 16. It is also unlikely that two bins 16 would be open together at any given time. It would be possible to include means for enforcing this, for example using a mechanism akin to that used in filing cabinets for anti-tilt purposes, by preventing more than one drawer 4 being opened at a time.

When a bin 16 is open, its open top does not suffer much spillage of cold air, and when a bin 16 is closed, the horizontal seals 60 apt to be used in the invention are inherently better at sealing-in cold air than the vertical seals commonly used in upright refrigerators and freezers. Whilst horizontal seals are known in chest freezers, this invention does not suffer the inconvenience and space problems of chest freezers, instead being akin in those respects to the much more popular upright appliances.

As there has to be a large temperature gradient between the cooled inner surfaces 62 of each bin 16 and its outer surfaces 28, 40, 44, 48, the bins 16 are constructed from an efficient insulating material so that the gradient is easily maintained with the outer surfaces 28, 40, 44, 48 remaining at, or close to, the ambient temperature. Materials such as phenolic foam or polyurethane foam (optionally skinned with GRP or a polycarbonate in a composite structure) are particularly preferred for the construction of the bins 16.

If segregation of the contents of a particular bin 16 is required, that bin 16 may be fitted with removable inserts 64. The inserts 64 are of varying shape and dimensions and may be used to define many types of compartments. For instance, an insert 64 may be a thin partition with a length corresponding to the length or width of the bin 16 in which it is received. An insert 64 may be a box, with or without a lid, or an insert 64 may include clips for holding bottles in place or trays for holding eggs or the like. An insert 64 could also be a wire basket or shelf.

As can be seen in FIG. 2, one or more of the bins 16 can be removed from the appliance 2 and fitted with an insulated cover 66. The bin 16 may then be taken away from the appliance 2, its insulated construction ensuring that it keeps its contents cool for a limited period of time. For instance, the bin 16 may be used as a cool-box, possibly in conjunction with ice-packs to keep the interior cool for as long as possible. Alternatively, the bin 16 with cover 66 may be kept close to the appliance 2 to provide added temporary cooled storage capacity, further bins 16 being fitted to the appliance 2 in that event.

It is also possible for a cover 66 to include a fridge engine powered internally by batteries or a gas supply or externally by mains electricity or a vehicle electricity supply.

Figure 5:
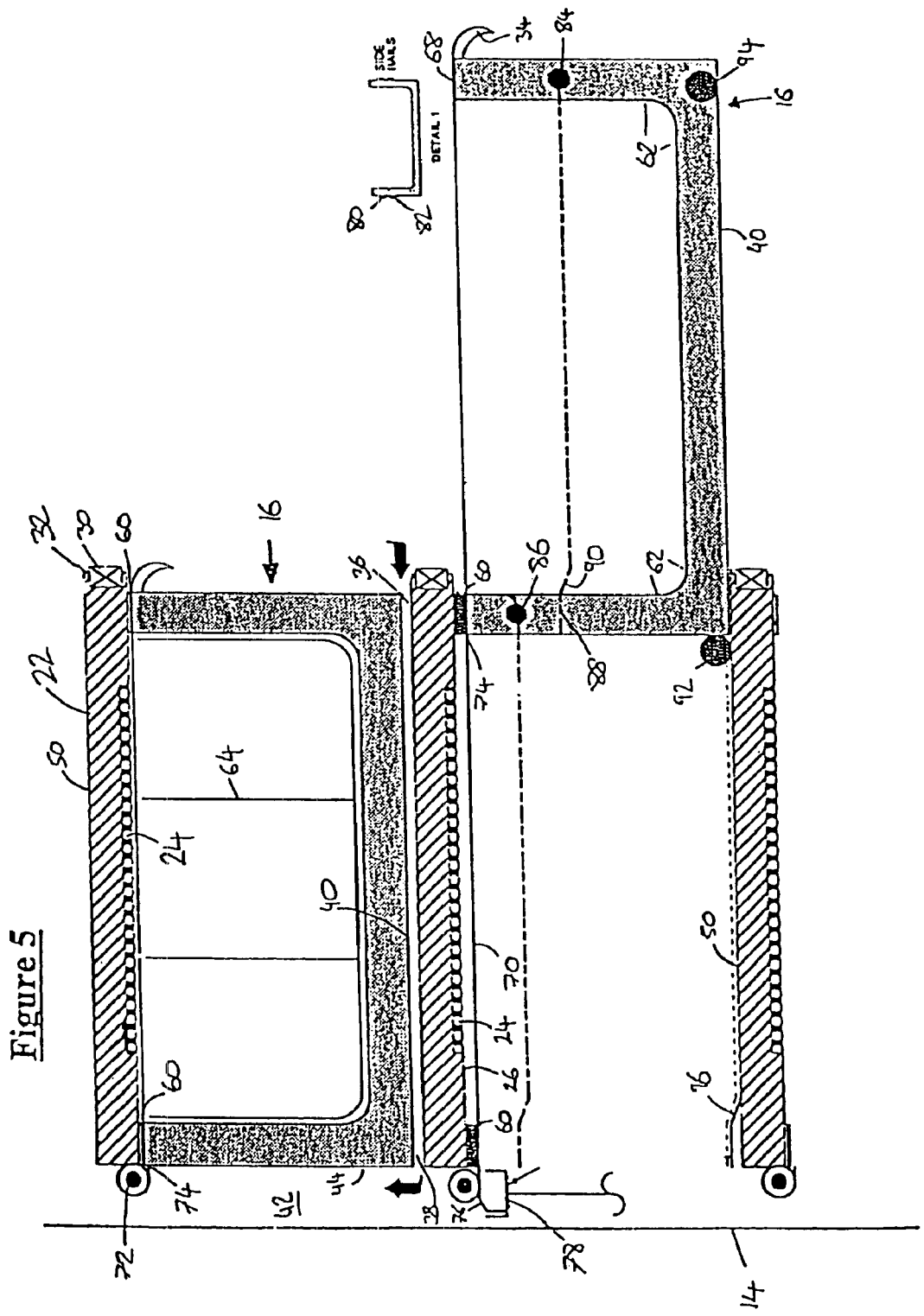
FIG. 5 is an enlarged schematic sectional side view of two drawers of the appliance of the preceding drawings, showing one way of mounting the drawers to the appliance.
Figure 6:
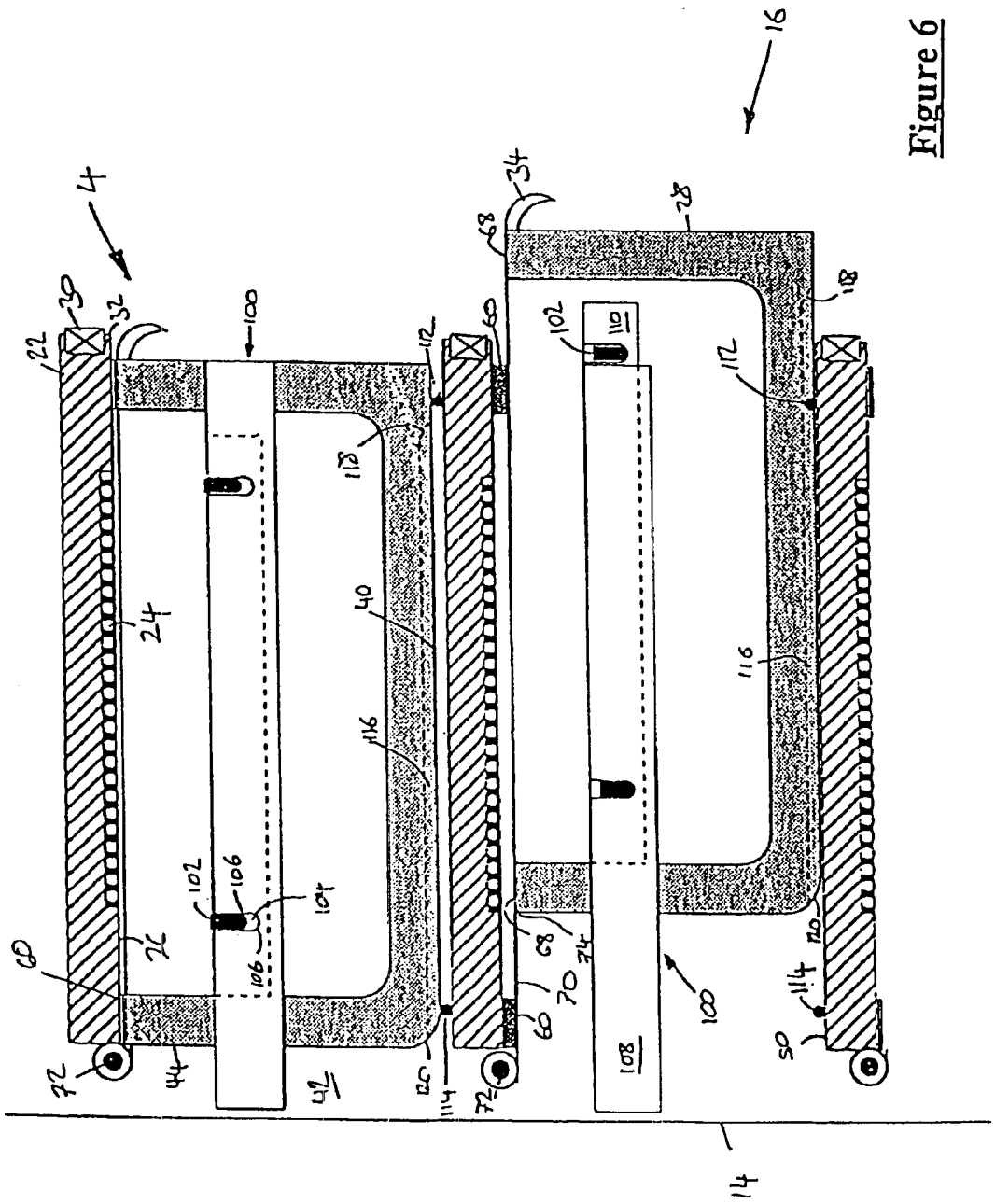
FIG. 6 is an enlarged schematic sectional side view of two drawers of an appliance in accordance with the invention, showing another way of mounting the drawers to the appliance and a way of mounting bins removably to the drawers.
Figure 7:
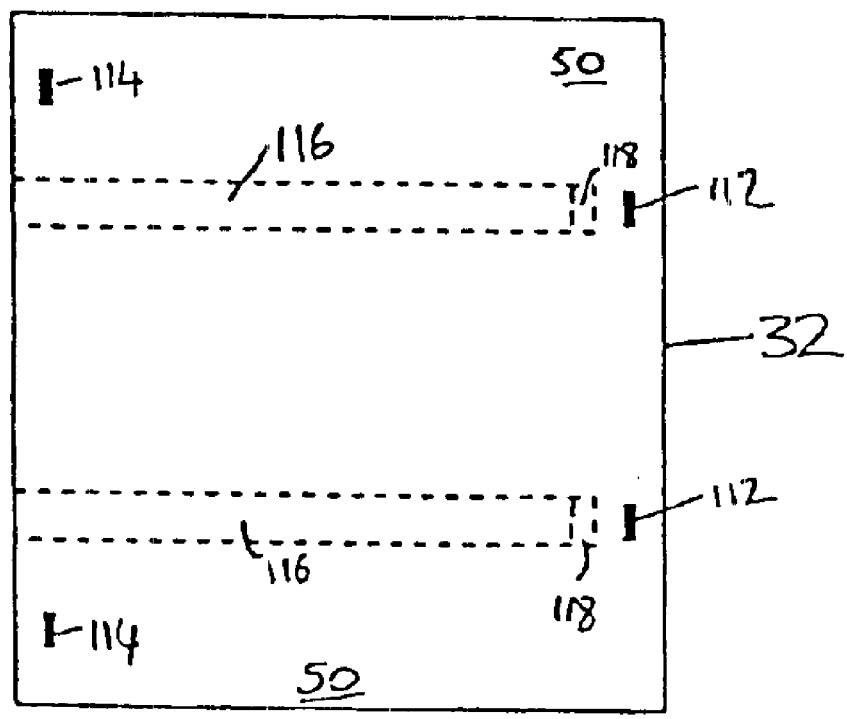
FIG. 7 is a plan view of a bin and lid of FIG. 6 showing the disposition of rollers and grooves used to mount the drawers to the appliance.

The drawers 4 and the interaction between the bins 16 and the lids 22 are shown in more detail in FIGS. 5, 6 and 7. FIG.

5 illustrates the drawers 4 of the embodiment described above with reference to FIGS. 1 to 4, whereas FIGS. 6 and 7 describe an alternative arrangement. Their common features will be described now and their differences will be discussed later.

FIGS. 5, 6 and 8 show clearly how, when a drawer 4 is in a closed position, the associated lid 22 closes the open top of the bin 16. A compressible seal 60 is provided under the lid 22, which seal 60 corresponds in size and position to the top edge 68 of the bin 16 that lies directly beneath the seal 60 when the drawer 4 is closed. The seal 60 can have magnetic qualities, for example being electro-magnetically operable, or may employ hydraulics or pneumatics as aforesaid. When the bin 16 is closed, the bin 16 compresses the seal 60 to form an airtight seal between the lid 22 and the bin 16. To do so, the bin 16 moves upwardly during the final part of a closing movement. The main differences between FIG. 5 on the one hand and FIGS. 6, 7 and 8 on the other hand lie in how this upward movement is achieved.

FIGS. 5 and 6 also show how the bottom of the lid 26 houses a heat exchanger 24 for cooling the interior of the bin 16. The heat exchanger 24 is positioned centrally with respect to the bin 16 beneath and occupies much of the underside area of the lid 22. The bottom surface of a heat exchanger 24 is flat and generally co-planar with the surrounding bottom surface of the lid 26, ensuring that the entire bottom surface of the lid can be wiped clean easily.

The heat exchanger 24 is controlled by a control element on the control and display panel 30 that is recessed into the front edge 32 of the lid 22, by which the selected temperature is set, and the heat exchanger 24 works accordingly. A temperature sensor is provided (not shown) operating via a feedback loop in well-known manner to alter the operation of the heat exchanger 24 as required to maintain the selected temperature. The heat exchanger 24 is connected to the refrigerator engine 20 that is also connected to all the other heat exchangers 24 of the appliance 2, the system being provided with valve means under control of the various control elements to adjust the cooling effect of each heat exchanger 24 as may be necessary to achieve the operation selected by a user.

It will be realised that each bin 16 comprises a separate independent cooled storage area. Accordingly the temperature can be set independently so that, if desired, a different temperature can be set for each bin 16. In fact, temperatures can be set below 0° C., so that a bin 16 can be used as a freezer or as a refrigerator at the user's option. In this way, the appliance 2 may function as a combined refrigerator and freezer where, advantageously, the ratio of refrigerated storage space to frozen storage space can be varied easily by changing the use of one or more of the bins 16. Of course, it will be appreciated that the drawers 4 can all be used as refrigerators or can all be used as freezers so that, in effect, the appliance 2 becomes either a dedicated refrigerator or freezer.

It will also be seen from FIGS. 5 and 6 that a screen 70 is provided for each drawer 16, the screen 70 being made from a thin flexible sheet material. The purpose of the screen 70 is to underlie the otherwise exposed heat exchanger 24 and the rest of the cold bottom surface 26 of the lid 22 when the drawer 4 is open. This is intended to prevent, as much as possible, warming of the bottom surface 26 of the lid 22 or cooling of the substantially ambient-temperature air within the cabinet 6.

In the embodiments illustrated, as a drawer 4 is closed, screen 70 is a flexible sheet that rolls itself onto a reel 72, so that it can be stored compactly within the ambientexposed void 42 at the rear of the bins 16. Each reel 72 is positioned adjacent to the lower rear edge of each lid 22, each reel 72 and its associated screen 70 extending across the width of the lid 22.

The front edge 74 of each screen 70 is removably attached to the upper part of the rear face 44 of the associated bin 16 so that when a drawer 4 is opened, the screen 70 is drawn forward with the bin 16. When the drawer 4 is opened, the screen 70 unrolls from the reel 72 to form a flat surface directly underneath the lid 22. When the drawer 4 is returned to its closed position, the screen 70 is taken up its reel 72 as aforesaid, for which purpose the reel 72 is biased in the rolling-up direction.

Accordingly, only a small volume of air occupies the gap between the lid 22 and the screen 70, which is advantageous as this air will be cooled by proximity to the lid 22. The screen 70 is preferably made of silvered or otherwise reflective plastics to suit its purpose of preventing heat transfer from the warm ambient air in the large void left by an open drawer 16 to the small volume of cold air between the screen 70 and the heat exchanger 24. Consequently, when the drawer 4 is returned to its closed position, only a very small volume of cooled air remains in the cabinet 6 when compared with the much larger volume of warm ambient air, causing only a negligible drop in temperature that is soon redressed by the resumption of ambient air flow into the cabinet 6.

Although designed to be heat-reflective and insulating, the underside of a screen 70 is likely to cool to some extent when the associated drawer 4 is opened. This may cause condensation or icing on the underside of the screen 70. To remove any such condensation or ice, a scraper 76 in the form of a plastics blade presses against the screen 70 where it is taken up onto the reel 72. When the drawer 4 is closed, the screen 70 runs over the scraper 76 and any condensed water or ice runs down the underside of the scraper 76 to be collected in a drain 78.

There is a minor difference in this respect between FIG. 5 and FIGS. 6 and 8 in that FIG. 5 shows the scraper 76 and drain 78 but FIGS. 6 and 8 do not. However, as will be clear, the scraper 76 and drain 78 could equally well be applied to the embodiments of FIGS. 6 and 7 and FIG. 8 if needs be.

Further to minimise loss of cold air and cooling of ambient air, shut-down means are provided to switch off a heat exchanger 24 when the associated drawer 4 is open. These means can include a contact switch (not shown) positioned at the rear of the lid 22 so that the back 44 of a bin 16 presses against the switch to close the switch when the drawer 4 is closed. When the drawer 4 is opened, the contact is broken and the heat exchanger 24 is switched off until the drawer 4 is closed once more. This facility is particularly useful when a bin 16 is removed from the appliance 2 for a period of time, so that the user does not have to remember to turn off the associated heat exchanger 24.

Referring now to the features specific to the embodiment of FIGS. 1 to 5, the mechanism for opening and closing a drawer 4 comprises a pair of rails 80, 82 provided on each side 48 of a bin 16 to hold the bin 16 when the drawer 4 is open. The rails 80, 82 are attached to the side panels 12 of the cabinet 6 and are disposed one above another on each side of the bin 16 as best shown in FIG. 3.

Four wheels 84, 86 are mounted to the sides 48 of the bin 16 to engage with the respective rails 80, 82. These wheels 84, 86 are only shown on the lower bin 16 of FIG. 5 and are disposed in two pairs, one front pair 84, and one rear pair 86, the front pair 84 being at a lower level than rear pair 86 so that the rear pair 86 engages the upper rails 80 and the front pair 84 engages the lower rails 82. Only one wheel of each pair 84, 86 can be seen in the side view of FIG. 5.

The lower rails 82, at least, are telescopic so as to remain engaged with the front wheels 84 when the drawer 4 is open. All of the rails 80, 82 terminate at their rear ends in an elevated portion 88 behind a ramp 90 whereby, when a drawer 4 is being closed, the wheels 84, 86 travel rearwardly along the respective rails 80, 82 and up the ramps 90 onto the elevated portions 88. In this way, the bin 16 moves upwardly near the end of its horizontal reaward travel so that its top edge 68 is forced upwards to compress the associated seal 60. Conversely, when the wheels 84, 86 travel forwardly along the rails 80, 82 as the drawer 4 is being opened, the wheels 80, 82 travel back down the ramps 90 to clear the bin 16 from the seal 60.

The bin 16 optionally also includes four lower wheels 92, 94 mounted at the bottom 40 of the bin 16. These lower wheels 92, 94 are again only shown on the lower bin 16 of FIG. 5 and are disposed in two pairs, one front pair 92 and one rear pair 94. As before, only one lower wheel of each pair 92, 94 can be seen in the side view of FIG. 5.

The lower wheels 92, 94 run upon a supporting surface being the top of a lid 22 beneath or, in the case of the bottom drawer 4 that does not have a lid 22 beneath, the top surface of the base panel 10.

When a drawer 4 is being closed, the lower wheels 92, 94 travel rearwardly along the supporting surface. When the drawer 4 is almost closed, each wheel 92, 94 travels up a ramp 96 (only a rear ramp 96 can be seen in FIG. 5), supporting the upward movement of the bin 16 near the end of its horizontal rearward travel.

Turning now to the embodiment shown in FIGS. 6 and 7, many features are shared with the embodiment of FIGS. 1 to 5 and so like numerals are used for like parts. As before, telescopic rails 100 support the opened drawer 4 but, in this instance, the rails 100 are adapted to permit removal of a bin 16 from the appliance 2. To this end, the bins 16 are provided with two lugs 102 on each side that are received within two correspondingly-shaped slots 104 in the rail 100. The lugs 102 and slots 104 extend vertically and have a rounded bottom edge 106: the rounded bottom edge 106 of the lug 102 assists in locating the lugs 102 into the slots 104 when a bin 16 is being returned to the appliance 2.

The telescopic rails 100 are of a two-piece construction. An outer rail 108 is attached to the adjacent side panel 12 of the cabinet 6 and so remains stationary in use, whilst an inner rail 110 that includes the slots 104 travels back and forward as the drawer 4 is opened and closed. As the rails 100 reside within the interior of the cabinet 6 that remains at or near to the ambient temperature, there is no problem of ice formation that could jam the sliding movement of the rails 100.

When a drawer 4 if fully or partially closed, its bin 16 is also supported from below by four rollers 112, 114 mounted on top of the lid 22 beneath the bin 16, except in the case of the lowest drawer 4 where the rollers 112, 114 are mounted on top of the bottom panel 10 of the cabinet 6, immediately beneath the lowest drawer 4. The rollers 112, 114 are of a diameter sufficient to span the air gap 38 beneath each bin 16, and are disposed in two pairs, one front pair 112 and one rear pair 114.

As seen in the plan view of FIG. 7, the front pair of rollers 112 are relatively close together and are aligned with parallel grooves 116 provided in the underside 40 of the bin 16, the grooves 116 extending from the back edge of the underside 40 to near the front edge of the underside 40, terminating in an inclined end face 118. The grooves 116 receive the front pair of rollers 112 when the drawer 4 is open, as shown in the lower drawer 4 of FIG. 6. It will also be noted that the bin 16 is clear of the rear pair of rollers 114 in this position. As none of the rollers 112, 114 bear against the bin 16 in this position, its weight is supported fully by the rails 100 and the lugs 102 are seated against the base of the slots 104.

When the drawer 4 is closed, the bin 16 travels horizontally backwards on its rails 100, initially without the rollers 112, 114 making contact with the underside 40 of the bin 16. When the drawer 4 is nearly closed, however, the rear rollers 114 make contact with the rounded lower rear edge 120 of the bin 16. The grooves 116 are of such a length that as the rear rollers 114 make contact with the lower rear edge 120 of the bin 16, the front rollers 112 make contact with the inclined end faces 118 of the grooves 116. Consequently, as the drawer 4 is pushed further back towards its closed position, the rounded lower back edge 120 of the bin 16 and the inclined end faces 118 of the grooves 116 ride up and over the rollers 112, 114 so that the bin 16 is lifted upwards. The lugs 102 ride up their slots 104 to permit this movement, whereupon the top edge 68 of the bin 16 is forced against the compressible seal 60. In this position, the weight of the bin 16 and its contents is removed from the rails 100, the rollers 112, 114 bearing the weight instead.

In reverse, when the drawer 4 is opened, the bin 16 moves downwards and forwards as the lower rear edge 120 clears the rear rollers 114 and the front rollers 112 are received again in the grooves 116. Once clear of the rollers 112, 114, the bin 16 supported on the rails 100 can travel freely to its fully open position with the support of the rails 100.

When the bins 16 are removed from and returned to the appliance 2, both operations are performed with the drawer 4 in its fully open position with the screen 70, if any, fully extended. To allow removal of the bin 16, the front edge 74 of the screen 70 is disengaged from the bin 16 and is held by retaining means in the form of a clip or other suitable retaining formation (not shown) depending from the lid 22.

Referring now to the embodiment shown in FIG. 8, many features are shared with the embodiments of FIGS. 1 to 7 and so, again, like numerals are used for like parts. The embodiment of FIG. 8 most closely resembles that of FIGS. 6 and 7, in that similar carriage and sealing mechanisms are used. This includes the inner 110 and outer 108 rails of that embodiment.

The principal difference with the embodiment of FIG. 8 is how the bins 16 are removably mounted to their associated drawers 4. It will be seen that the inner rails 110 are attached to side arms 122 of a cradle 124 that surrounds and embraces the lower portion of a bin 16, to which end the cradle 124 also has front and back retaining members 126 and base supports 128.

A bin 16 is installed into a cradle 124 when its drawer 4 in its open position. The base 40 of the bin 16 rests on the supports 128 with the sides 44 of the bin 16 being retained within the retaining members 126 and arms 122. With the drawer in the open position, the bin 16 sits fully within the cradle 124 so that the top 68 of the bin 16 clears the seal 60 and so that the rollers 112 are received in the grooves 116.

As in the embodiment of FIGS. 6 and 7, the bin 16 travels rearward into the cabinet 6 when the drawer 4 is closed and, when nearly in its closed position, the passage of the rounded lower edge 120 of the bin 16 and the inclined end faces 118 of the grooves 116 over the rollers 112, 114 lifts the bin 16 up to compress the seal 60. As the bin 16 is lifted, it rises within the cradle 124 and is supported by the rollers 112, 114 alone.

Whilst a screen is not shown in FIG. 8, this embodiment allows, advantageously, the front edge 74 of a screen 70 to be attached to part of the cradle 124 of its associated drawer 4. In this way, the screen 70 may be left attached to the cradle 124 at all times, irrespective of whether or not a bin 16 is still within the cradle 124, so that there is no need to engage or disengage the screen 70 from the bin 16 whenever a bin 16 is placed in or removed from the drawer 4.

FIGS. 9(a), 9(b) and 9(c) show a variant of the invention in which a hinged door 130 defining the front wall of a drawer 4 of the appliance can be opened from the vertical to the horizontal to allow the bin 16 to be slid forwardly and removed from the drawer 4 without lifting. The door 130 is hinged along its lower edge to swing down through 90° as shown in FIG. 9(b) when a handrail 132 on the top front edge of the door 130 is pulled. The drawer 4 can then be opened as normal by pulling on the handrail 132.

As before, the drawer 4 runs on telescopic rails 100 (only one being visible in side view) but, in this case, the forward end of each rail 100 carries a respective slotted guide 134 defining a slot 136 that extends up and down, orthogonally with respect to the telescoping direction of the rail 100. A link 138 is pivotally attached at a first end to the door 130 near the upper edge behind the handrail 132. The opposed second end of the link 138 is constrained to run in the slot 136 defined by the guide 134 so that when the door 130 is closed as shown in FIG. 9(a), the second end lies at or near the bottom end of the slot 136 and when the door 130 is open as shown in FIG. 9(b), the second end abuts the top of the slot 136. This abutment suitably prevents the door 130 opening beyond 90° and so holds the open door 130 horizontal in a manner capable of supporting the weight of a loaded bin 16 as shown in FIG. 9(c).

As the second end of the link 138 moves upwardly along the slot 136 in the guide 134 while the door 130 opens, the link 138 pulls the guide 134, and hence the attached end of the rail 100, forwardly together with the bin 16 carried by the rail 100. This is shown in FIG. 9(b). Nevertheless, forward movement of the bin 16 can continue as shown in FIG. 9(c) which shows the bin 16 being removed simply by sliding it out from the extended rails 100, using the horizontal rear surface of the open door 130 as a support for the continued sliding movement of the bin 16.

FIGS. 10 and 11 show top-sealing variants in which further means are provided to assist compression of the seal 60 by lifting the bin 16 as it closes. The variant of FIG. 10 also employs means to bias the drawers 4 into the closed position, both functions being performed elegantly in FIG. 10 by using gravity to close the drawer 4 and to compress the seal 60. Specifically, the FIG. 10 variant contemplates mounting the drawers 4 on inclined runners, rails or supports 140 that tilt downwardly towards the rear of the appliance so that the drawer 4 tends to slide rearwardly down the incline into the closed position. This incline (the steepness of which is much exaggerated in FIG. 10 for the purposes of illustration) therefore serves to bias the drawer 4 from the open position of the lower drawer 4 of FIG. 10 into the closed position of the upper drawer 4 of Figure 10.

It will also be noted from FIG. 10 that the lid 22 and the opposed runners, rails or supports 140 are not parallel: the distance between them lessens going rearwardly, defining a rearwardly narrowing, tapering gap that accommodates the bin 16 when the drawer 4 is closed as shown in the upper drawer 4 of FIG. 10. The result is that although the bin 16 slides downwardly in absolute terms as it moves rearwardly, the bin 16 also moves relatively upwardly in relation to the lid 22 in a ramping or wedging action and so compresses the seal as the drawer 4 closes.

In the variant of FIGS. 11(a) to 11(d), a crank 142 assists lifting a bin 16 into sealing engagement with a horizontal top seal 60 as the drawer 4 is closed. The crank 142 associated with a particular drawer 4 is pivotally attached to the lid 22 of the drawer 4 below, and stands proud of the lid 22 near its rear end. More specifically, the crank 142 stands in the path of the bin 16 so as to engage the rear of a bin 16 as the associated drawer 4 nears its fully closed position.

As best shown in the enlarged views of FIGS. 11(b) to 11(d), the crank 142 is generally U-shaped and comprises an L-shaped actuating lever 144 attached at a pivot 146 to a lifting arm 148 that terminates in a roller 150 to complete the U-shape. The crank 142 is biased into the upright position shown in FIGS. 11(a) and 11(b), in which the free end portion of the actuating lever 144 extends forwardly and the lifting arm 148 is correspondingly retracted parallel to both the free end portion of the actuating lever 144 and the upper surface of the lid 22. In that retracted state, the lifting arm 148 and its associated roller 150 lie close enough to the lid 22 to fit within a gap maintained under the bin 16 by a forward roller 152. Consequently, the lower rear edge of a rearwardly-moving bin 16 can ride over the roller 150 when the lifting arm 148 is retracted. As it does so, the rear face of the bin 16 bears against the free end portion of the actuating lever 144 as shown in FIG. 11(c), simultaneously causing the crank 142 to pivot and the lifting arm/roller 148/150 to rise out of the retracted position, thus lifting the bin 16 until the drawer 4 is fully closed and the bin 16 is fully lifted as shown in FIG. 11 (d).

Figure 12:
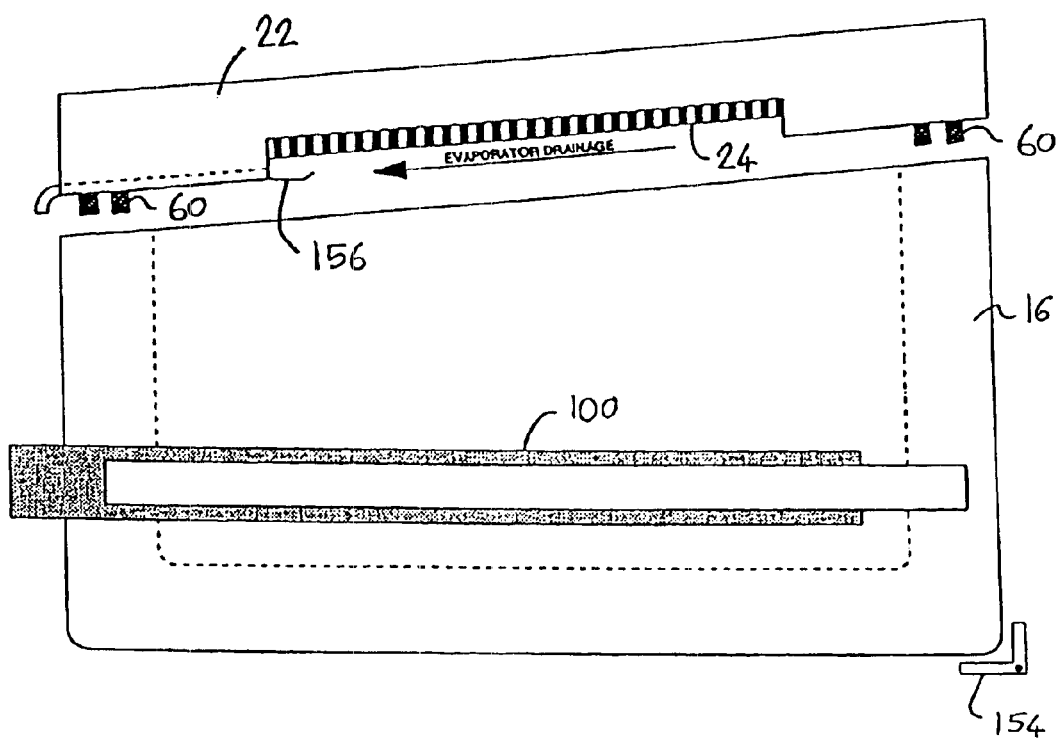
FIG. 12 is a schematic side view of a variant akin to the variant of FIG. 10 but employing a horizontal rail and an inclined evaporator cooling means.

The variant of FIG. 12 is akin to that of FIG. 10 in that there is a tapering gap between the lid 22 and the rails 100 moving rearwardly, but in this instance the rails 100 are horizontal and only the lid 22 is inclined. The result is that the bin 16 is wedge-shaped to wedge into the tapering gap as the associated drawer 4 is closed, thereby to compress a seal 60 between the lid and the bin 16. The seal 60 is kept compressed by a latch, catch or magnet that prevents the bin 16 moving away from the lid 22 until it is desired to gain access to the bin 16. FIG. 12 contemplates magnetic seals supplemented by a catch 154 that engages the front lower edge of the bin 16 when the drawer 4 is closed.

A benefit of the variants of FIGS. 10 and 12 is that the incline of the lid 22 and hence of the evaporator cooling means 24 in the lid 22 promotes drainage of moisture condensing on the evaporator 24. A gutter 156 is shown in FIG. 12 at the rear of the lid 22 below the evaporator 24 to channel water away from the evaporator 24 for removal through suitable drainage pipes (not shown).

Whilst generally horizontal top seals 60 between bin 16 and lid have been proposed in all of the foregoing embodiments, it is possible to employ generally vertical side seals in addition or in the alternative. FIGS. 13(a) and 13(b) show a preferred way of making side seals work effectively in the invention, by making the lid 22 fit within a surrounding rim portion 158 of the bin 16. As can be seen in the plan view of FIG. 13(a), the lid 22 tapers toward the front and the rim portion 158 of the bin 16 is correspondingly shaped so that the bin 16 can move freely away from the lid 22 as the corresponding drawer 4 is opened, whereas the lid 22 is squeezed within the tapering sides of the rim portion 158 as the drawer 4 is closed. This compresses a side seal 160 around the vertical external side walls of the lid 22 or within the corresponding vertical internal side walls of the rim portion 158, effecting good sealing between the lid 22 and the bin 16 as the drawer 4 closes. Like the variant of FIG. 12, the seal is kept compressed by a latch, catch or magnet (not shown) that prevents the bin 16 moving away from the lid 22 until it is desired to gain access to the bin 16.

Figure 15:
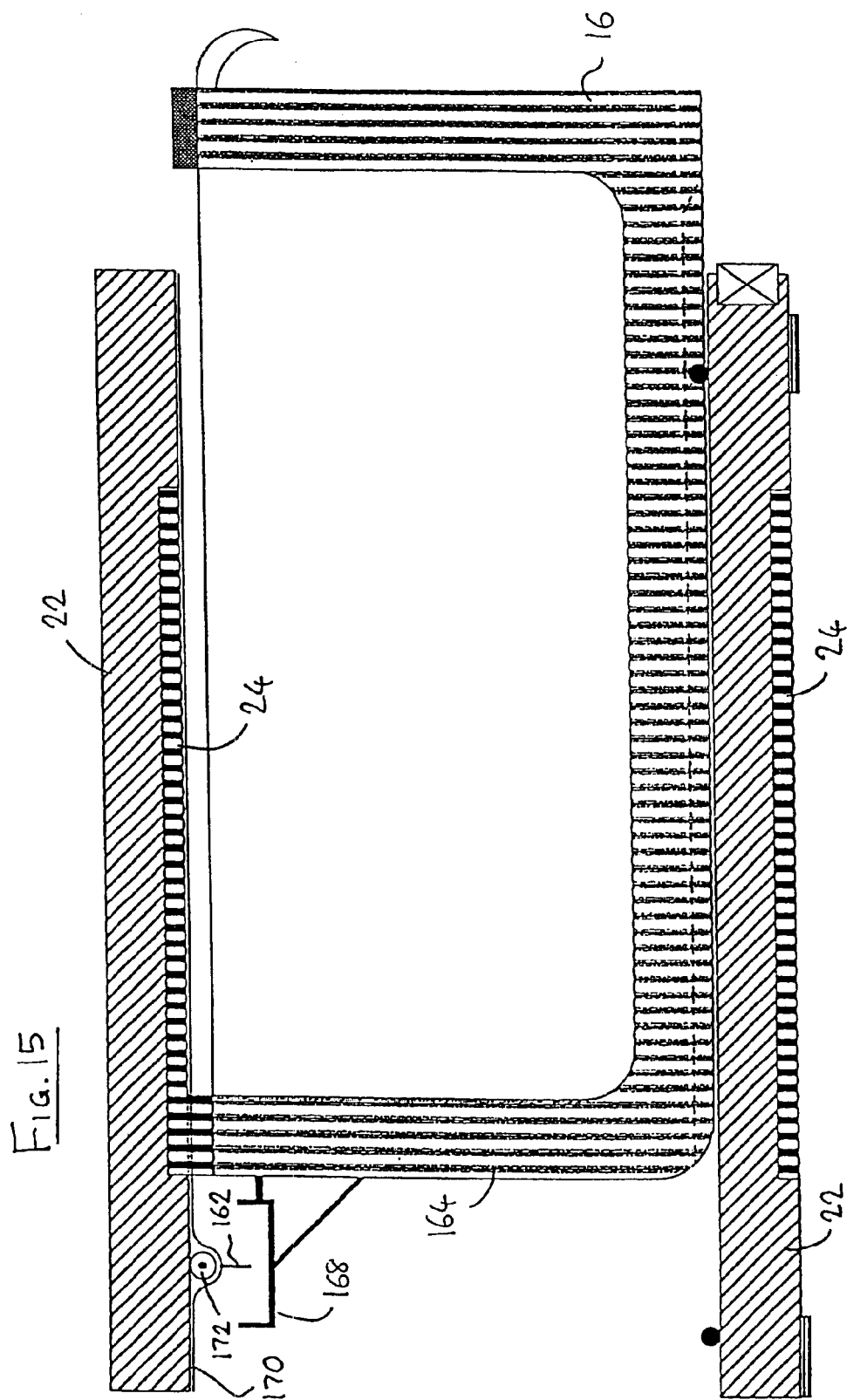
FIG. 15 is a sectional schematic side view of a further scraper variant, in this case employing deformation of a flexible membrane to promote the removal of ice and moisture from the evaporator.

FIGS. 14 and 15 show variants of the invention in which means are provided to remove ice or moisture from the exposed undersurface of the evaporator cooling means 24 in a lid The variant of FIGS. 14(a) and 14(b) employs a dual-action scraper comprising a pair of parallel oppositely-angled blades 162 fixed to the rear wall 164 of a bin 16 to present their respective scraper edges to the undersurface of the evaporator 24. As the blades 162 are oppositely angled with respect to the undersurface of the evaporator 24, the rear blade 162 of the pair removes ice or moisture from the evaporator 24 as the drawer 4 associated with the bin 16 is opened and the front blade 162 of the pair does likewise as the drawer 4 is closed. Ice or drips of moisture 166 scraped or wiped from the evaporator 24 fall into a drain pan 168 below the blades 162 from which they can be drained or left to melt and evaporate.

As in FIG. 14, the further scraper variant of FIG. 15 employs a drain pan 168 fixed to the rear wall 164 of a bin 16 that catches ice or water falling from a blade 162 also fixed to the rear wall 164 of the bin 16. A single blade 162 is shown, although a pair of blades 162 as used in FIG. 14 is also possible. However, the FIG. 15 variant differs fundamentally from the FIG. 14 variant in that a flexible membrane 170 closely underlies the undersurface of the evaporator 24 so that the membrane 170 serves as the cooling interface between the evaporator 24 and the interior of a bin 16. Ice or water will therefore tend to collect on the membrane 170 rather than on the evaporator 24 itself. A roller 172 or other transverse rod is fixed to the rear wall 164 of the bin 16 along with the drain pan 168 and the blade 162 so as to travel with the moving drawer 4 in alignment with and opposed to the blade 162. The roller 172 is supported at its ends to lie between the evaporator 24 and the membrane 170 so as to peel the membrane 170 away from the evaporator 24 and to deform the membrane 170 locally in the region of the blade 162. This promotes the removal of ice and moisture from the membrane 170 by cracking off any ice and encouraging the formation of drips that run into the drain pan 168.

If and when the time comes to defrost the appliance of the invention, FIG. 16 shows how a defrost tray 174 can be seated into the top of a bin 16 to catch moisture dripping from the evaporator 24. The tray 174 comprises a central recess 176 shaped to sit snugly into the open top of the bin 16, surrounded by a peripheral rim 178 that lies on top of the walls of the bin 16 to bear the load of the tray 174. It is envisaged that the tray 174 can be placed on top of a bin 16 in this manner when the associated drawer 4 is open and the evaporator 24 has been switched off (preferably by a microswitch sensing the action of opening the drawer 4 as aforesaid), whereupon the drawer 4 can be partially closed to an extent necessary to align the tray 174 under the evaporator 24 but not so far as to trigger the microswitch and so to switch the evaporator 24 back on. The switched-off evaporator 24 then slowly defrosts and the tray 174 catches the resulting drips.

It will be noted from FIG. 16 that the rim 178 at the rear of the defrost tray 174 is extended rearwardly and angled upwardly to define a scraper edge 180 that abuts the underside of the lid 22. The purpose of this feature is to scrape any moisture droplets remaining on the underside of the evaporator 24 when the drawer 4 is opened after defrosting. The tray 174 can then be removed and the water in the recess 176 poured away.

FIG. 16 illustrates the further refinement of an absorbent pad 182 in the recess 176 of the defrost tray 124. This pad 182 absorbs free water in the recess 176 and so makes spillage less likely when the tray 174 is removed. The pad 182 could be of a heatable material so as to accelerate the defrosting process, and can be either pre-heated (preferably being of a microwave-heatable material) or heated in situ by electric or other heating elements.

Variations are also possible in the layout and nature of the cooling means and fridge engine. For example, as shown in FIG. 17, the aforementioned evaporator 24 over each bin 16 can be replaced by a fan coil cooling arrangement in which air is supplied and extracted via a remote fan coil unit. Specifically, a heat exchanger 184 is cooled by a cooling system 186 to extract heat from air circulated by a fan 188. The cold air exhausting from the heat exchanger 184 is fed into the closed bin 16 and warmer air is extracted from the bin 16 by the fan 188 to be cooled by the heat exchanger 184 and recirculated. This is the system used in forced air circulation refrigerators and so-called 'frost free' freezers, and has the advantage that the majority of condensed water and ice can be dealt with outside the cooled compartment. For example, the heat exchanger 184 may employ an automatic defrost facility in which moisture drips into a drain tray 190 under the heat exchanger 184 when the heat exchanger 184 is shut down periodically.

Potentially, therefore, features such as the scraper blades 162 and defrost tray 174 of the preceding variants can be eliminated.

Whilst shown applied to a single bin 16 in FIG. 17 for clarity, a fan coil cooling arrangement may similarly be applied to a plurality of bins 16. The bins 16 can be connected by a common manifold and share the same circulating air, but for reasons of cross-contamination it is preferred that each bin 16 has a separate circulation path although these can share a common heat exchanger. However, wholly separate circulation paths would aid the preferred objective of independent temperature control in each bin 16.

FIGS. 18 and 19 show another variant in which a bin 16 and its lid 22 are adapted to promote drainage of condensation from the evaporator 24. To this end, as best shown in FIG. 19, the evaporator 24 is dished on its underside to define a square central depression housing a temperature sensor 192 surrounded by four facets 194 extending downwardly and outwardly at a pitch of approximately 5°. The pitch of the facets 194 is such as to lead condensed moisture on the evaporator 24 outwardly under force of gravity to drip into a gutter 196 (FIG. 18) formed by a groove provided in the upper peripheral wall of the bin 16.

FIG. 18 shows that each gutter 196 comprises two inclined portions 198 each leading downwardly to a shared drainage conduit 200 that communicates through a J-bend in the wall of the bin 16 to external drainage pipes (not shown).

In all of the above embodiments, viewing means may be provided to assist a user in viewing the contents of any bin 16 that is too high to be viewed easily from above through its open top. At its simplest, a window may be provided in the front and/or bottom of a bin 16. Another way of viewing the contents would be to place a mirror above the open bin 16, the mirror being angled to provide a view from above the bin 16 even though the user's eye line is below the mirror and possibly also below the bin 16. Preferably, the mirror is retractable when not needed for use, for example being hinged to the front panel 52 of the refrigerator engine compartment 18—the mirror can even constitute that panel 52—or being foldable out of the front of a bin 16. Even if the bin 16 is a little above the user's head, the benefit of a view from above means that it will usually be possible to reach into the bin 16 to access its contents as desired.

Referring finally to FIGS. 20(a), 20(b) and 20(c), these show how the inventive concept can be scaled up to encompass bulk storage in a cold store and commercial transportation in a refrigerated vehicle. FIG. 20(a) shows a vehicle 202 carrying a standardised refrigerated storage container 204 that is akin to the bins 16 of the preceding embodiments, being an insulated container defined by normally-closed walls having an open top closed by an openable insulated lid 206 that preferably includes a cooling means in the form of a roof-mounted refrigerator engine 208. As shown in FIG. 20(b), the lid 206 can be opened so that goods 210 can be loaded and unloaded from above using an overhead gantry crane 212 without losing cold air from the container 204. A further advantage is that the entire plan area of the container 204 can be accessed readily by the crane 212 rather than relying for access upon a restricted door in the rear or side of the container 204.

FIG. 20(c) shows how full containers 204 can be left without lids in the refrigerated environment of a cold store 214, which may be a building as shown or some other refrigerated storage facility such as a ship's cargo hold. The associated lids 206 and refrigerator engines 208 can be used elsewhere during that storage period. If containers 204 are stacked, a container 204 can serve as the lid 206 for the container 204 below. When required, a container 204 can be fitted with a lid 206 and refrigerator engine 208 and lifted on to a suitable vehicle 202 for transport wherever necessary.

Many other variations are possible within the inventive concept. For example, rather than employing the vertical array of drawers 4 common to the embodiments described above, a side-by-side arrangement of drawers 4 is also contemplated. Indeed, it is possible to have any number of drawers, from one upwards, and to have any desired arrangement of drawers.

The configuration of air gaps 38 around the bins 16 may be varied without departing from the inventive concept. Furthermore, the circulation of air around the interior of the cabinet 6 can be assisted in several ways.

Whilst the bins 16 described above are largely rectangular in shape as this is optimally space-efficient, any polygonal or rounded shape may be adopted, even a hemisphere. Of course, a wide variety of bin sizes and depths is possible within the inventive concept.

The construction of the bins 16 may also be varied: whilst solid-walled bins 16 fabricated from insulating material have been described, it may be desirable to adopt a vacuum design; i.e. to use double-walled bins, the two walls being separated by a partial vacuum or merely an insulating medium of trapped air.

Whilst a roll-out screen 70 is described in the foregoing specific embodiments, it is only one solution to the problem of providing a retractable screen. Other variations include folded sheets that concertina upon closing a drawer, or a telescopic stack of sheets that slide apart so that the end of one sheet pulls the front of the next sheet as they are pulled from the stack.

In addition, whilst using a scraper 76 is a convenient method of removing condensation from the screen 70, other methods are possible. Most simply, water can be allowed to drain from the screen 70 of its own accord, to be collected in a suitably positioned tray.

Instead of providing a dedicated control and display panel 30 for each bin 16, all of the bins 16 could be controlled by a single central control and display panel 30. Further, whilst it is preferred that all of the bins 16 are individually controllable whether by a single shared panel 30 or by a plurality of dedicated panels 30, it is possible within the inventive concept to predetermine the bin temperatures of a multi-bin appliance. The predetermined temperatures may vary from bin to bin to provide zones for storage of different items, or two or more bins may share the same temperature or function. For example, it would be possible to designate a multi-bin appliance as all refrigerator or all freezer if one wished to do so, although the possibility remains of varying temperature within the typical refrigerator or freezer temperature range if desired.

The invention lends itself to manual or automatic operation of opening and closing movements. Automatic operation may, for example, assist opening of the gravity-closing variant of FIG. 10.

It is also possible for a partial vacuum to be applied to a closed bin so as to remove oxygen and other gases and enzymes, thereby to slow product degradation.

In general, therefore, reference should be made to the appended claims and other general statements herein rather than to the foregoing specific description as indicating the scope of the invention. In interpreting the invention, it should be understood that although features of the illustrated enbodiments have been described in combination with each other and although such combinations may have advantages of their own, many of those features can be applied independently. So, those features are considered to be independently patentable whether within or beyond the inventive concepts expressed herein.

What is claimed is:

1. A cold-storage appliance including:
    an open-topped Insulating container defining an external surface;
    an insulating lid adapted to close the open top of the container;
    a cooling means adapted to cool the interior but not the exterior of the container, said cooling means introducing cooling by way of said insulating lid; and
    a structure supporting the container, the lid and the cooling means;
    wherein the container is mounted to the structure for movement relative to the structure and the lid to open the container and afford access to its interior or to close the container, and wherein at least a majority of the external surface of the container is exposed to ambient air when the container is closed by the lid.

2. The appliance of claim 1, wherein said movement includes a major generally horizontal component of movement provided by means running along at least one generally horizontal track.

3. The appliance of claim 2, wherein the track includes at least one rail.

4. The appliance of claim 3, wherein the or each rail is telescopic.

5. The appliance of claim 2, wherein the track is exposed to ambient air.

6. The appliance of claim 1 wherein said container is supported by wheels or rollers running along a generally horizontal support surface and said movement includes a major generally horizontal component.

7. The appliance of claim 1, wherein the cooling means is substantially flush with the underside of the lid.

8. The appliance of claim 1, wherein the structure is a frame which is adapted to be built-in between cupboards or other structures.

9. The appliance of claim 1, wherein the structure defines at least one ambient air circulation channel around the external surface of the closed container.

10. The appliance of claim 1, further including a means for drawing in ambient air from the front of the appliance and wherein said structure defines a front panel including at least one opening for admission of ambient air.

11. The appliance of claim 1, further including a means for dividing the interior of the container.

12. The appliance of claim 1, wherein the cooling means includes an evaporator exposed to the interior of the container when the container is closed.

13. The appliance of claim 1, the cooling means includes cold air ducts to feed cold air into the container when the container is closed.

14. The appliance of claim 13, wherein the cold air is supplied by a fan coil circuit.

15. The appliance of claim 6, wherein the support surface is exposed to ambient air.

16. The appliance of claim 1, wherein the cooling means is integral with the lid.

17. The appliance of claim 10, wherein the front panel further comprises control and/or display means.

18. A cold-storage appliance including:
an open-topped insulating container defining an external surface;
an insulating lid adapted to close the open top of the container;
a cooling means adapted to cool the interior but not the exterior of the container; and
a structure supporting the container, the lid and the cooling means;
wherein the container is mounted to the structure for movement relative to the structure and the lid to open the container and afford access to its interior or to close the container, said movement including a minor generally vertical component, said mounting permitting said generally vertical movement, and wherein at least a majority of the external surface of the container is exposed to ambient air when the container is closed by the lid.

19. The appliance of claim 18, wherein the container lifts against the lid upon closing and drops away from the lid upon opening.

20. The appliance of claim 18, wherein the track or support surface includes a ramp effecting said vertical component of movement.

21. The appliance of claim 18, and including crank means responsive to closing movement of the container to lift the container toward the lid.

22. A cold-storage appliance including:
an open-topped insulating container defining an external surface;
an insulating lid adapted to close the open top of the container;
a cooling means adapted to cool the interior but not the exterior of the container; and
a structure supporting the container, the lid and the cooling means;
wherein the container is mounted to the structure for movement relative to the structure and the lid to open the container and afford access to its interior or to close the container, wherein at least a majority of the external surface of the container is exposed to ambient air when the container is closed by the lid, and wherein closing movement of the container with respect to the structure and the lid wedges together the container and the lid, said wedging being effected by a track or support surface supporting the container that converges with the lid in the closing direction of the container.

23. The appliance of claim 22, wherein the lid is received and embraced by a rim portion of the container that squeezes the lid laterally when the container and the lid wedge together.

24. The appliance of claim 22, wherein the lid and the rim portion are complementarily tapered.

25. The appliance of claim 22, comprising holding means for holding the container wedged against the lid.

26. A cold-storage appliance including:
an open-topped insulating container defining an external surface;
an insulating lid adapted to close the open top of the container;
a magnetic, hydraulic, or pneumatic seal that seals the container to the lid when the container is closed;
a cooling means adapted to cool the interior but not the exterior of the container; and
a structure supporting the container, the lid and the cooling means;
wherein the container is mounted to the structure for movement relative to the structure and the lid to open the container and afford access to its interior or to close the container, and wherein at least a majority of the external surface of the container is exposed to ambient air when the container is closed by the lid.

27. The appliance of claim 26, wherein the seal is compressible.

28. The appliance of claim 26, wherein the seal is electromagnetic.

29. A cold-storage appliance including:
an open-topped insulating container defining an external surface:
an insulating lid adapted to close the open top of the container,
a cooling means adapted to cool the interior but not the exterior of the container; and
a structure supporting the container, the lid and the cooling means;
wherein the container is mounted to the structure for movement relative to the structure and the lid to open the container and afford access to its interior or to close the container, said opening movement being against the force of gravity, and wherein at least a majority of the external surface of the container is exposed to ambient air when the container is closed by the lid.

30. A cold-storage appliance including:
an open-topped insulating container defining an external surface;
an insulating lid adapted to close the open top of the container;
a cooling means adapted to cool the interior but not the exterior of the container; and
a structure supporting the container, the lid and the cooling means;
wherein the container is mounted to the structure for movement relative to the structure and the lid to open the container and afford access to its interior or to close the container, and wherein substantially all of the external surface of the container is exposed to ambient air when the container is closed by the lid and the appliance is in use.

31. A cold-storage appliance including:
an open-topped insulating container defining an external surface;
an insulating lid adapted to close the open top of the container;
a cooling means adapted to cool the Interior but not the exterior of the container;
a structure supporting the container, the lid and the cooling means; and
a scraper or wiper means associated with the container to remove ice or water from the cooling means upon relative movement between the container and the lid;
wherein the container is mounted to the structure for said movement relative to the structure and the lid to open the container and afford access to its interior or to close the container, and wherein at least a majority of the external surface of the container is exposed to ambient air when the container is closed by the lid.

32. The appliance of claim 31, and including first and second scraper or wiper blades arranged respectively to remove ice or water from the cooling means during opening and closing of the container.

33. A cold-storage appliance including:
an open-topped insulating container defining an external surface;
an insulating lid adapted to close the open top of the container;
a cooling means adapted to cool the interior but not the exterior of the container; and
a structure supporting the container, the lid and the cooling means;
wherein the container is mounted to the structure for movement relative to the structure and the lid to open the container and afford access to its interior or to close the container, wherein at least a majority of the external surface of the container is exposed to ambient air when the container is closed by the lid, and further including a flexible membrane associated with the cooling means and means for locally deforming the membrane to remove ice or water from the membrane upon relative movement between the container and the lid.

34. A cold-storage appliance including:
an open-topped insulating container defining an external surface;
an insulating lid adapted to close the open top of the container;
a cooling means adapted to cool the interior but not the exterior of the container;
a structure supporting the container, the lid and the cooling means; and
a shut-down means for shutting down the cooling means when the container is not closed;
wherein the container is mounted to the structure for movement relative to the structure and the lid to open the container and afford access to its interior or to close the container, and wherein at least a majority of the external surface of the container is exposed to ambient air when the container is closed by the lid.

35. The appliance of claim 34, wherein the shut-down means includes a switch closed by presence of the container.

36. A cold-storage appliance including:
an open-topped insulating container defining an external surface;
an insulating lid adapted to close the open top of the container;
a cooling means adapted to cool the interior but not the exterior of the container;
a structure supporting the container, the lid and the cooling means; and
a retractable screen which is extensible to screen the cooling means when the container is open;
wherein the container is mounted to the structure for movement relative to the structure and the lid to open the container and afford access to its interior or to close the container, and wherein at least a majority of the external surface of the container is exposed to ambient air when the container is closed by the lid.

37. The appliance of claim 36, wherein the screen is attached at one end to the structure and at an opposed end to the container or to means associated with the container.

38. The appliance of claim 36, wherein the screen is removably attached to the means associated with the container.

39. The appliance of claim 38, further including retaining means for retaining the screen in a wholly or partially extended configuration when the screen is detached from the container.

40. The appliance of claim 36, wherein the screen is exposed to ambient air when retracted.

41. The appliance of claim 36, wherein the screen is furled on a roller when retracted.

42. The appliance of claim 36, wherein the screen is heat-reflective.

43. The appliance of claim 36, wherein a wiper or scraper is operable during retraction of the screen to remove water or ice from the screen.

44. The appliance of claim 36, wherein the screen is biased into a retracted configuration.

45. The appliance of claim 1, further including a means for exhausting to the front of the appliance air that has been heated by a heat exchanger.

46. The appliance of claim 36, wherein the container is removable from the structure and an auxiliary lid is attachable to the container when so removed, wherein the retractable screen is attached at one end to the structure and at an opposed end to the container or to a movable cradle adapted to receive the container.

47. A cold-storage appliance including:
an open-topped insulating container defining an external surface;
an insulating lid adapted to close the open top of the container;
a cooling means adapted to cool the interior but not the exterior of the container;
a structure supporting the container, the lid and the cooling means; and
an impeller for promoting admission and exhaustion of ambient air;
wherein the container is mounted to the structure for movement relative to the structure and the lid to open the container and afford access to its interior or to close the container, and wherein at least a majority of the external surface of the container is exposed to ambient air when the container is closed by the lid.

48. A cold-storage appliance including:

an open-topped insulating container defining an external surface;

an insulating lid adapted to close the open top of the container;

a cooling means adapted to cool the interior but not the exterior of the container; and a structure supporting the container, the lid and the cooling means;

wherein the container is mounted to the structure for movement relative to the structure and the lid to open the container and afford access to its interior or to close the container, wherein at least a majority of the external surface of the container is exposed to ambient air when the container is closed by the lid, wherein said container is removable from the structure and an auxiliary lid is attachable to the container when so removed.

49. A cold-storage appliance including:

an open-topped insulating container defining an external surface;

an insulating lid adapted to close the open top of the container;

a cooling means adapted to cool the interior but not the exterior of the container;

a structure supporting the container, the lid and the cooling means; and a means for exhausting ambient air to the front of the appliance;

wherein the container is mounted to the structure for movement relative to the structure and the lid to open the container and afford access to its interior or to close the container, and wherein at least a majority of the external surface of the container is exposed to ambient air when the container is closed by the lid.

50. A cold-storage appliance including:

an open-topped insulating container defining an external surface;

an insulating lid adapted to close the open top of the container;

a cooling means adapted to cool the interior but not the exterior of the container; and a structure supporting the container, the lid and the cooling means;

wherein the container is mounted to the structure such that it can be moved with respect to the structure and the lid in a plurality of different directions to open the container and afford access to Its interior or to close the container, and wherein at least a majority of the external surface of the container is exposed to ambient air when the container is closed by the lid.

51. A cold-storage appliance including:

a plurality of open-topped insulating containers defining an external surface;

an insulating lid associated with each container and adapted to close the open top of said each container;

a cooling means associated with each container and adapted to cool the interior but not the exterior of said each container; and a structure supporting the containers, the lids and the cooling means;

wherein each container is mounted to the structure for movement relative to the structure and its respective lid to open said each container and afford access to its interior or to dose said each container, and wherein at least a majority of the external surface of said each container is exposed to ambient air when it is closed by its respective lid.

52. The appliance of claim 51, wherein the respective cooling means are independently controllable.

53. The appliance of claim 51, wherein the cooling means are connected to a common refrigerator engine.

54. The appliance of claim 51, wherein the containers are stacked one above another.

55. The appliance of claim 51, further including means for preventing opening of a container when another container of the plurality is open.

56. The appliance of claim 51, wherein the containers are of different interior sizes, shapes or volumes.

57. A cold-storage appliance including:

an open-topped insulating container defining an external surface;

an insulating lid adapted to close the open top of the container;

a viewing means to assist a user In viewing the contents of a container;

a cooling means adapted to cool the interior but not the exterior of the container; and a structure supporting the container, the lid and the cooling means;

wherein the container is mounted to the structure for movement relative to the structure and the lid to open the container and afford access to its interior or to close the container, and wherein at least a majority of the external surface of the container is exposed to ambient air when the container is closed by the lid.

58. The appliance of claim 57, wherein a viewing window is provided in the front and/or bottom of a container.

59. The appliance of claim 57, and including a viewing mirror positioned above the container to afford a reflected view from above the container into its open top.

60. The appliance of claim 59, wherein the mirror is retractable when not in use.

61. The appliance of claim 60, wherein the mirror is attached to the container.

62. The appliance of claim 60, and having a plurality of containers, wherein the mirror is positioned above the containers to view the contents of any of the containers.

63. A cold-storage appliance including:

an open-topped insulating container defining an external surface;

an insulating lid adapted to close the open top of the container;

a cooling means adapted to cool the interior but not the exterior of the container;

a defrost tray positionable in the container below the cooling means; and a structure supporting the container, the lid and the cooling means;

wherein the container is mounted to the structure for movement relative to the structure and the lid to open the container and afford access to its interior or to close the container, and wherein at least a majority of the external surface of the container is exposed to ambient air when the container is closed by the lid.

64. The appliance of claim 63, wherein the defrost tray includes a scraper or wiper means to remove ice or water from the cooling means upon relative movement between the container and the lid.

65. The appliance of claim 63, wherein the defrost tray includes an absorbent insert.

66. The appliance of claim 65, wherein the insert is heatable.

67. A cold-storage appliance including:
- an open-topped insulating container defining an external surface;
- an insulating lid adapted to close the open top of the container;
- a cooling means adapted to cool the interior but not the exterior of the container, said cooling means being generally inclined or having locally inclined portions to promote drainage of moisture condensed thereon away from the interior of the container; and
- a structure supporting the container, the lid and the cooling means;

wherein the container is mounted to the structure for movement relative to the structure and the lid to open the container and afford access to its interior or to close the container, and wherein at least a majority of the external surface of the container is exposed to ambient air when the container is closed by the lid.

68. The appliance of claim 67, wherein the cooling means communicates with ducts in the lid or the container for drainage of moisture away from the cooling means.

69. A cold-storage appliance embodied in a refrigerated vehicle application, said appliance including:
- an open-topped insulating container defining an external surface;
- an insulating lid adapted to close the open top of the container;
- a cooling means adapted to cool the interior but not the exterior of the container; and
- a structure supporting the container, the lid and the cooling means;

wherein the container is mounted to the structure for movement relative to the structure and the lid to open the container and afford access to Its interior or to close the container, and wherein at least a majority of the external surface of the container is exposed to ambient air when the container is closed by the lid.

70. The appliance of claim 69, and wherein the application is a vehicle-mountable container.

71. A cold-storage appliance including:
- an open-topped insulating container defining an external surface;
- an insulating lid adapted to close the open top of the container;
- a cooling means adapted to cool the interior but not the exterior of the container; and
- a structure supporting the container, the lid and the cooling means;

wherein the container is mounted to the structure for movement relative to the structure, relative to the cooling means and relative to the lid to open the container and afford access to its interior or to close the container, and wherein at least a majority of the external surface of the container is exposed to ambient air when the container is closed by the lid.

72. The appliance of claim 71, wherein said movement of the container includes a major generally horizontal component of movement provided by means running along at least one generally horizontal track.

73. The appliance of claim 71, wherein the container is supported by wheels or rollers running along a generally horizontal support surface.

74. The appliance of claim 71, wherein substantially all of the external surface of the container is exposed to ambient air when the container is closed by the lid.

75. The appliance of claim 71, wherein the structure is a frame which is adapted to be built-in between cupboards or other structures.

76. The appliance of claim 71, further including a means for drawing in ambient air from the front of the appliance and wherein said structure defines a front panel including at least one opening for admission of ambient air.

77. The appliance of claim 71, further including a means for dividing the interior of the container.

78. The appliance of claim 71, wherein the structure defines at least one ambient air circulation channel around the external surface of the closed container.

79. The appliance of claim 71, and including a means for exhausting to the front of the appliance air that has been heated by a heat exchanger.

80. A cold-storage appliance including:
- an open-topped insulating container defining an external surface;
- an insulating lid adapted to close the open top of the container;
- a cooling means adapted to cool the interior but not the exterior of the container; and
- a structure supporting the container, the lid and the cooling means;

wherein the container is mounted to the structure for movement relative to the structure and the lid to open the container and afford access to its interior or to close the container, said movement including a major generally horizontal component which is effected by opening a door of the appliance, and wherein at least a majority of the external surface of the container is exposed to ambient air when the container is closed by the lid.

81. A cold-storage appliance including: an open-topped insulating container defining an external surface;
- an insulating lid adapted to close the open top of the container;
- a cooling means adapted to cool the interior but not the exterior of the container;
- a means for drawing in ambient air from the front of the appliance;
- a means for exhausting ambient air to the front of the appliance; and
- a structure supporting the container, the lid and the cooling means, said structure defining a front panel including at least one opening for admission of ambient air;

wherein the container is mounted to the structure for movement relative to the structure and the lid to open the container and afford access to its interior or to close the container, and wherein at least a majority of the external surface of the container is exposed to ambient air when the container is closed by the lid.

* * * * *

UNITED STATES PATENT AND TRADEMARK OFFICE
CERTIFICATE OF CORRECTION

PATENT NO. : 6,915,657 B2
DATED : July 12, 2005
INVENTOR(S) : Ian David Wood

It is certified that error appears in the above-identified patent and that said Letters Patent is hereby corrected as shown below:

Column 1,
Line 27, "modem refrigerators" should read -- modern refrigerators --;

Column 3,
Line 15, "possibility of crosscontamination" should read -- possibility of cross-contamination --;

Column 7,
Line 49, "showing a dualaction" should read -- showing a dual-action --;

Column 12,
Line 1, "within the ambientexposed" should read -- within the ambient-exposed --;

Column 13,
Line 13, "horizontal reaward" should read -- horizontal rearward --;

Column 17,
Line 11, "in a lid" should read -- in a lid 22 --;

Column 20,
Line 41, "open-topped Insulating" should read -- open-topped insulating --;

Column 22,
Line 41, "external surface:" should read -- external surface; --;
Line 44, "the container," should read -- the container; --;

Column 23,
Line 11, "cool the Interior" should read -- cool the interior --;

Column 25,
Line 49, "to Its interior" should read -- to its interior --;
Line 67, "to dose said" should read -- to close said --;

Column 26,
Line 19, "a user In viewing" should read -- a user in viewing --;

UNITED STATES PATENT AND TRADEMARK OFFICE
CERTIFICATE OF CORRECTION

PATENT NO. : 6,915,657 B2
DATED : July 12, 2005
INVENTOR(S) : Ian David Wood

It is certified that error appears in the above-identified patent and that said Letters Patent is hereby corrected as shown below:

Column 27,
Line 37, "to Its interior" should read -- to its interior --.

Signed and Sealed this

Thirteenth Day of December, 2005

JON W. DUDAS
*Director of the United States Patent and Trademark Office*